United States Patent [19]

Asada et al.

[11] Patent Number: 5,117,293
[45] Date of Patent: May 26, 1992

[54] METHOD OF AND APPARATUS FOR GENERATING CONVERSION CURVE EMPLOYABLE FOR CONVERTING REPRODUCTION CHARACTERISTIC OF IMAGE

[75] Inventors: Shinji Asada; Yasuharu Yonezawa, both of Tenjinkitamachi, Japan

[73] Assignee: Dainippon Screen Mfg. Co. Ltd., Japan

[21] Appl. No.: 616,189

[22] Filed: Nov. 20, 1990

[30] Foreign Application Priority Data

Nov. 28, 1989 [JP] Japan ................................ 1-308484
Oct. 24, 1990 [JP] Japan ................................ 2-287753

[51] Int. Cl.⁵ .............................................. H04N 1/23
[52] U.S. Cl. .................................... 358/298; 358/456; 358/80
[58] Field of Search ............... 346/140 R; 358/75, 78, 358/80, 298, 454, 455, 456, 458

[56] References Cited

U.S. PATENT DOCUMENTS

| | | | |
|---|---|---|---|
| 4,402,015 | 8/1983 | Yamada | 358/455 |
| 4,833,546 | 5/1989 | Numakura et al. | 358/75 |
| 4,924,323 | 5/1990 | Numakura et al. | 358/456 |
| 4,956,718 | 9/1990 | Numakura et al. | 358/298 |

Primary Examiner—William M. Shoop, Jr.
Assistant Examiner—Larry Moskowitz
Attorney, Agent, or Firm—Ostrolenk, Faber, Gerb & Soffen

[57] ABSTRACT

On a conversion plane of image data, first through third points ($Q_H$, $Q_S$, $Q_D$) are provided. The first and second points are determined in accordance with highlight and shadow points of an original image, respectively, while the third point is determined in accordance with a dummy shadow point of the original image. A conversion curve ($C_a$, $C_b$) is so determined as to pass through the first and second points and to extend along a straight line (L) connecting the first and third points in the highlight region of the coordinate plane.

20 Claims, 14 Drawing Sheets

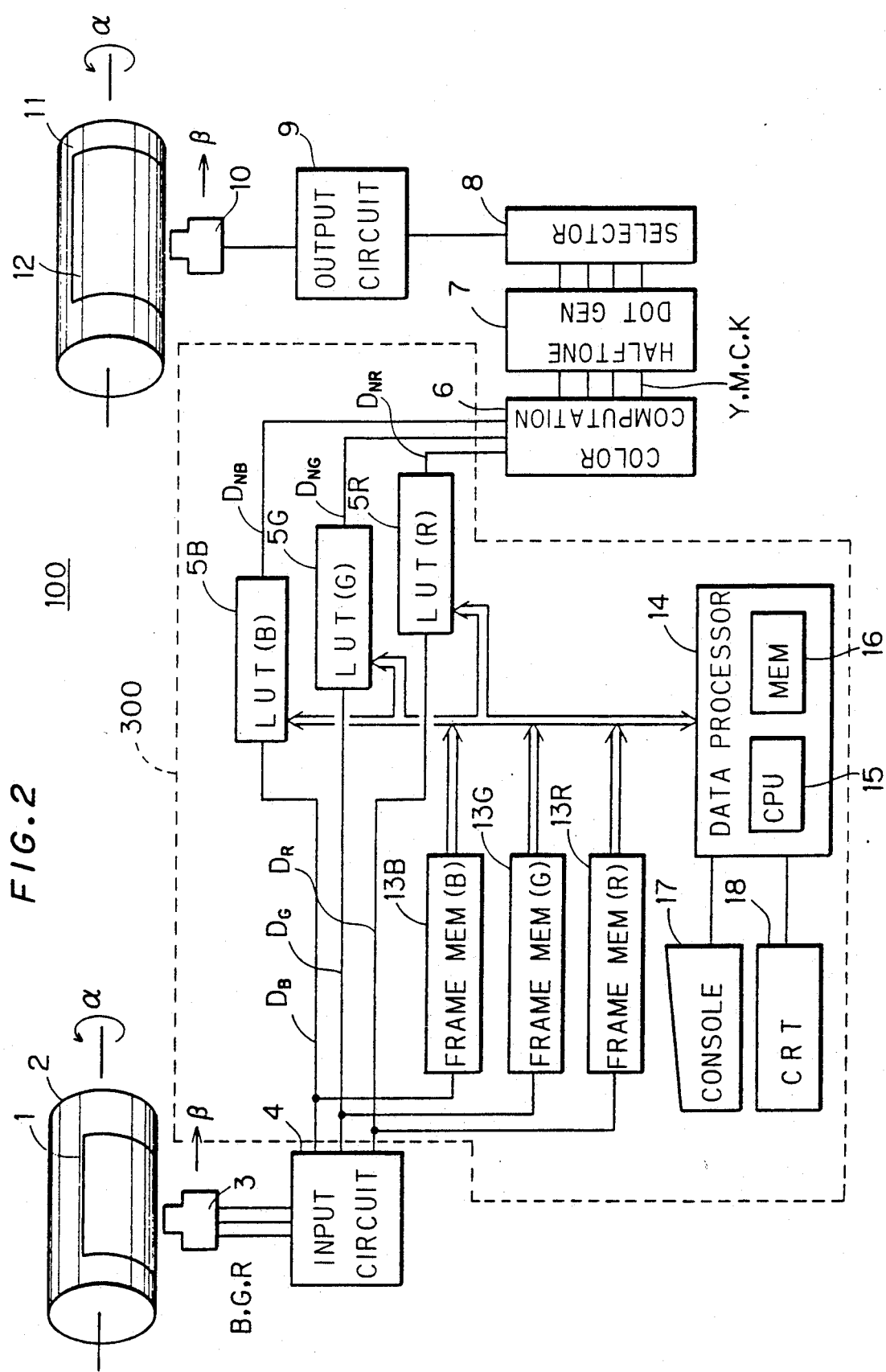

$D_{Mmin}$ : MINIMUM DENSITY ON IMAGE
$D_{MmAX}$ : MAXIMUM DENSITY ON IMAGE $RN_H$, $RN_S$ : CUMULATIVE DENSITY OCCURRENCE RATES

DUMMY SHADOW DENSITY VALUE
$D_{DSX}(X=B,G,R)$

METHOD OF AND APPARATUS FOR GENERATING CONVERSION CURVE EMPLOYABLE FOR CONVERTING REPRODUCTION CHARACTERISTIC OF IMAGE

BACKGROUND OF THE INVENTION

1. Field of the Invention

The present invention relates to a method of and apparatus for generating a conversion curve employable for converting a reproduction characteristic of an image and more particularly to a technique suitable for automatic generation of the conversion curve in a process scanner and the like. The present invention may be applied to a method of systematically correcting color fogging caused only in a shadow part of a color original in a color image processor such as a color process scanner.

2. Description of the Related Art

In a color process scanner and the like, an image of a color original is color-separated and thereafter each color component is converted into a halftone dot signal to record a reproduced image. When color fogging is present in the original, color separation conditions are corrected in the judgement of an operator so that gray balance is ensured in a recorded image.

In a first conventional method for correcting the color separation conditions, different highlight and shadow density values are set for respective color components in a process for converting a density signal for each color component obtained by reading the original to fit a density range of a color separation device, that is, a normalization conversion process.

In a second conventional method, highlight and shadow density values are set in common to each color component, and halftone dot percentage for each color block is corrected in the stage where the halftone dot signal for each color block: yellow (Y), magenta (M), cyan (C) and black (K) is determined.

There are generally two problems in such conventional methods.

One problem is that a skilled operator is required for proper correction, because the color separation conditions are corrected fundamentally based on a manual operation controlled by an operator. This type of problem occurs not only in the correction of the color separation conditions but also in the normalization conversion in a monochrome image.

The other problem is one inherent in obtaining the aforesaid gray balance. In the two conventional methods, improvement is recognized in the case where a color fogging is present in low and middle density regions due to a deviation in the light-emission characteristic of a light source in photographing a subject for producing the original and in the case where the original is discolored as a whole.

It is however difficult to carry out appropriate correction through the conventional methods in the case where a color fogging caused only in a shadow part results from a difference between respective maximum values of color components in expressible density on an original film. Since uniform correction is carried out over a whole range of density in the conventional methods, the correction for removing the color fogging in the shadow part influences the low and middle density regions, and as a result the gray balance in the low and middle density regions is lost.

UCA/UCR (Under Color Add/Removal) function in the color separation device should be used to remove the color fogging only on the high density side while preventing such states. By using this function, only the halftone dot percentage of gray component having high density is adjustable for each color printer in relation to the gray component.

However, when the UCA/UCR function is used, the lower limit of the density range to be corrected must be set manually for each color printer. The decision of a correction amount is largely dependent on the operator's sense because the correction amount is also based on the darkest part in the original. That is, the work of removing the color fogging by means of the UCA/UCR function is not objective and systematic but temporary. Thus the correction amount of the color fogging by means of the UCA/UCR function cannot be controlled systematically and quantitatively, which causes a hindrance to automatic determination of color separation conditions.

In addition, since a UCA/UCR circuit is provided in the rear stage of a black-printer signal generation circuit in the color separation device, each circuit in the preceding stage of the UCA/UCR circuit must process a signal before gray balance correction, and establishment of the processing characteristic thereof is complicated.

Furthermore, a technique which handles together both gray balance correction in the case where the entire original is discolored and color fogging correction only in the shadow part has not been developed, and these corrections must be conducted separately in the conventional techniques.

SUMMARY OF THE INVENTION

The present invention is directed to a method of generating a conversion curve for converting first density values obtained by photoelectrically reading an object image for each pixel and defined in a first density range into second density values defined in a second density range and having a reproduction characteristic suitable for prescribed image processing.

According to the present invention, the method comprises the steps of: (a) designating a highlight density value and a shadow density value within the first density range; (b) determining a dummy shadow density value within the first density range according to a predetermined determination rule; and (c) generating the conversion curve so as to satisfy both of the following conditions (1) and (2):

(1) The conversion curve substantially passes through first and second points on a two-dimensional coordinate plane on which the conversion curve is defined, where the first and second points are determined in accordance with the highlight density value and the shadow density value, respectively.

(2) On the two-dimensional coordinate plane, the conversion curve extends along a line in a highlight density region which is defined around the highlight density value, where the line is so defined as to pass through the first point and a third point determined in accordance with the dummy shadow density value.

In the present invention, the first through third points are specified on the coordinate plane in accordance with the highlight density value, the shadow density value and the dummy shadow density value. In the highlight part on the coordinate plane, the conversion curve is formed along the straight line connecting the first and third points. In the shadow part, the conversion curve deviates from the straight line to pass through the second point.

When the object image is a color image, the method may further comprise the step of: (d) conducting the steps (a) through (c) for each color component to obtain the conversion curve for each color component.

In an aspect of the present invention, the method is effective for compensating a color fogging only in a shadow part of the object image, and the step (b) comprises the steps of: (b-1) determining whether or not there is a fogging only in a shadow part on the object image; and (b-2) when there is fogging only in the shadow part, determining the dummy shadow density value for each color component such that the dummy shadow density value is different from the shadow density value by a value representing an amount of the fogging in each color component.

In this structure of the present invention, the shadow density value and the dummy shadow density value are determined so that the difference therebetween is adapted to correspond to the color fogging amount only in the shadow part of the object image. The deviation of the conversion curve from the straight line accordingly has the function of eliminating the color fogging only in the shadow part. Since the deviation occurs substantially in the shadow part or in the vicinity thereof on the coordinate plane, the gray balance of the low and middle density regions is not lost.

In another aspect of the present invention, the step (b) comprises the steps of: (b-1) determining a first value proportional to a width of a density range in a reference image; (b-2) determining a second value proportional to the highlight density value; and (b-3) summing the first and second values to obtain the dummy shadow density value.

The present invention also provides an apparatus adapted for the above indicated methods, which may be a color process scanner. As used herein, the term "density" present invention generally designates not only an optical density itself but also an amount expressing image gradation such as a signal level obtained by photoelectrically reading the optical density and a Munsell value.

Accordingly, an object of the present invention is to provide a method of and apparatus for generating a conversion curve systematically executable without a skilled operator and particularly suitable for automation.

Another object of the present invention is to generate a conversion curve applied to correction of color separation conditions for a color original and capable of controlling a correction amount of color fogging only in a shadow part systematically and quantitatively.

Another object is to supply each circuit in a color separation device with a signal after gray balance correction to facilitate the establishment of processing characteristics in the circuits.

A further object of the present invention is to provide a technique capable of handling together gray balance correction in the case where the whole of an original is discolored and color fogging correction only in a shadow part and particularly suitable for automation of color separation conditions.

Yet still another object is to generate a conversion curve capable of particularly preventing density expressively in an image after conversion from being affected largely by the density range of an original.

These and other objects, features, aspects and advantages of the present invention will become more apparent from the following detailed description when taken in conjunction with the accompanying drawings.

BRIEF DESCRIPTION OF DRAWINGS

FIG. 2 is a block diagram of the color process scanner;

DESCRIPTION OF PREFERRED EMBODIMENTS

A. Overall Structure and Operation of First Preferred Embodiment

Figure 1:
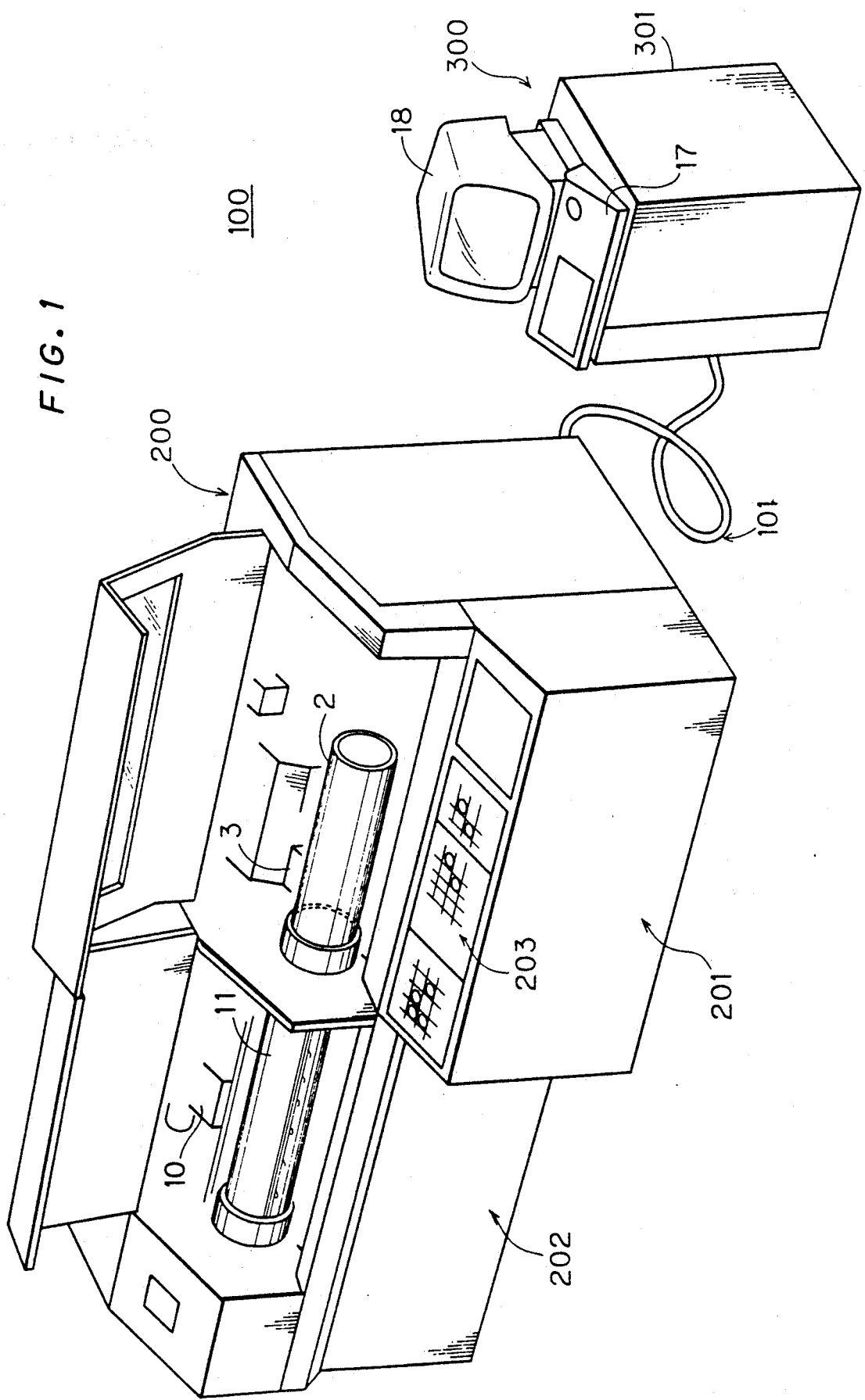
FIG. 1 is an external view of a color process scanner according to a first preferred embodiment of the present invention.

As illustrated in FIG. 1, a process scanner 100 in accordance with the present invention comprises a scanner unit 200 and a color separation auxiliary device 300. The unit 200 and the device 300 are electrically connected to each other by a transmission cable 101. The scanner unit 200 consists of an input part 201 and an output part 202. The input part 201 comprises an original drum 2 and a pickup head 3. The output part 202 comprises a recording drum 11 and a recording head 10. In the example shown in FIG. 1, an operation panel 203 is located next to the input part 201.

The scanner unit 200 itself has no means for automatically setting color separation conditions. This function is performed by a color separation auxiliary device 300. The device 300 comprises a CRT 18 and a console 17 disposed on a device body 301.

In FIG. 2, the components of the scanner unit 200 are illustrated outside of the broken line (which is representative of the color separation auxiliary device 300). A positive color original film is wound around the original drum 2. The pickup head 3 is displaced opposite the original drum 2. Main scanning and subscanning of the original are achieved by rotation of the drum 2 in the direction α and translation of the pickup head 3 in the direction β, respectively, whereby the pickup head 3 photoelectrically reads each pixel of the image of the original 1 along scanning lines.

Electronic signals representative of the color components of (blue (B), green (G), and red (R)) of the image are supplied to an input circuit 4. The circuit 4 converts the signals B, G and R into digital color density signals $D_B$, $D_G$ and $D_R$, respectively.

In prescanning (described later), these signals $D_B$, $D_G$ and $D_R$ are stored in frame memories 13B, 13G and 13R for each pixel respectively. The signals $D_B$, $D_G$ and $D_R$ are supplied from the frame memories 13B, 13G to a data processor 14 (e.g., a microcomputer). 13R and the data processor 14 generates conversion curves for converting a reproduction characteristic of each color component of the image. The conversion curves may be referred to as normalization curves, since the conversion includes an operation for normalizing the range of the color density signals in accordance with a density range suitable for data processing for image recording. The details of this process are described later. A CPU 15 and a memory 16 are used in this process. The console 17 is provided for manually inputting various commands and data to the data processor 14. The conversion curves generated in the data processor 14 for the components B, G and R are stored as (numerical data) in lookup table memories (LUTs) 5B, 5G and 5R.

Next, to record the image, regular scanning of the original i is carried out. The signals $D_B$, $D_G$ and $D_R$ obtained at this time are subjected to normalization conversion using the conversion curves stored in the LUTs 5B, 5G and 5R and are thereby converted into signals $D_{NB}$, $D_{NG}$ and $DN_R$. The signals $D_{NB}$, $D_{NG}$ and $D_{NR}$ are supplied to a color computation circuit 6. In the color computation circuit 6, based on the signals $D_{NB}$, $D_{NG}$ and $D_{NR}$ is executed so that respective color printer signals for Y, M, C and K are generated. These signals are converted into Y, M, C and K halftone dot signals in a halftone dot converter 7. And the halftone dot signals are combined by a selector 8 into a time-shared signal to be supplied to an output circuit g as a modulation signal.

The recording head 10 has a laser light source and ON/OFF modulates a laser beam according to the modulation signal supplied by the output circuit 9. A photosensitive film 12 is wound around the recording drum 11. The drum 11 is rotated in the direction α and the recording head is translated in the direction β. Accordingly, the laser beam exposes each pixel of the film 12 along scanning lines.

B. Conversion Curve Generating Operation in First Preferred Embodiment

Figure 3A:
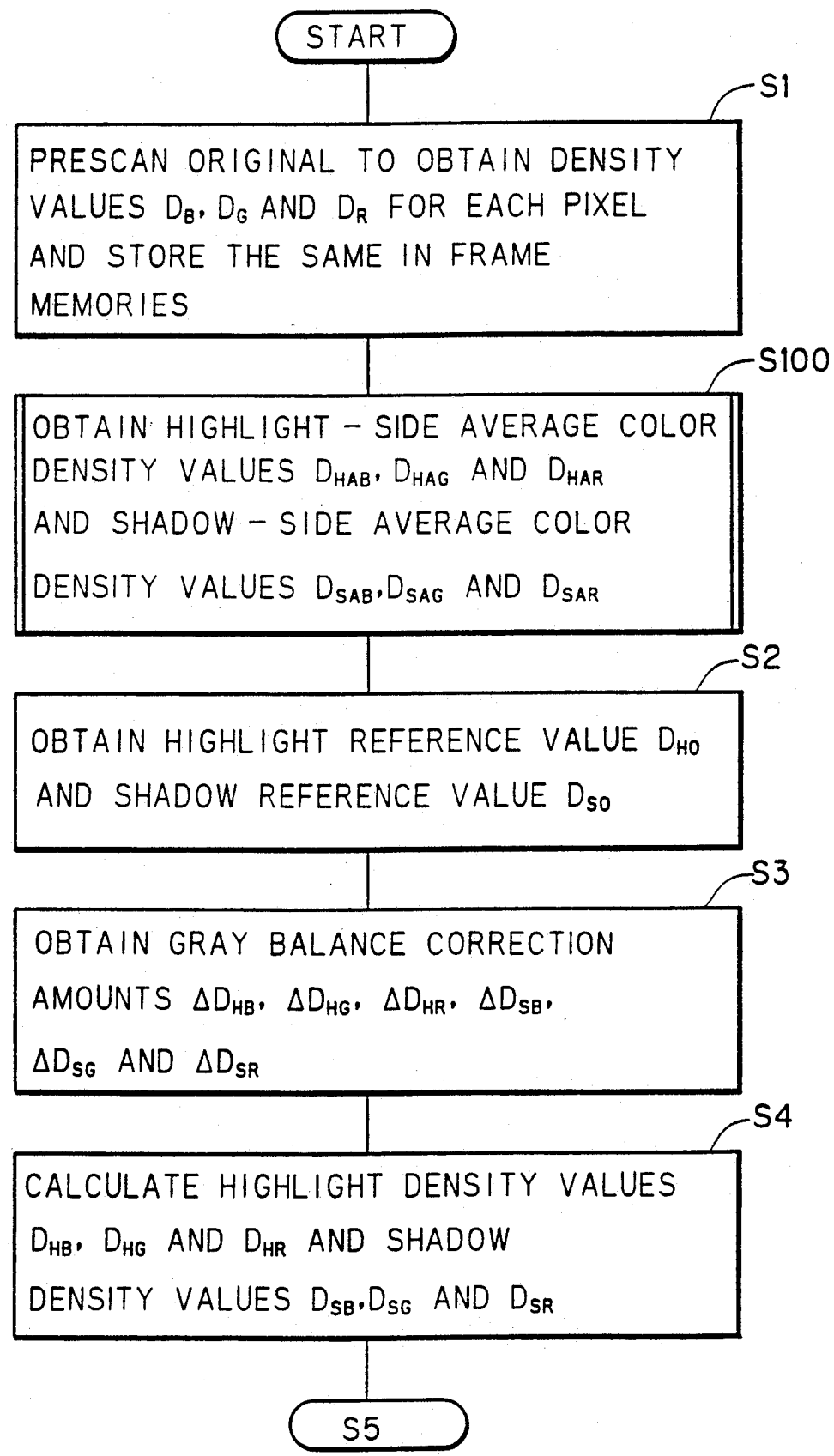
FIGS. 3A and 3B are flow charts showing the operation of the first preferred embodiment.
Figure 3A:
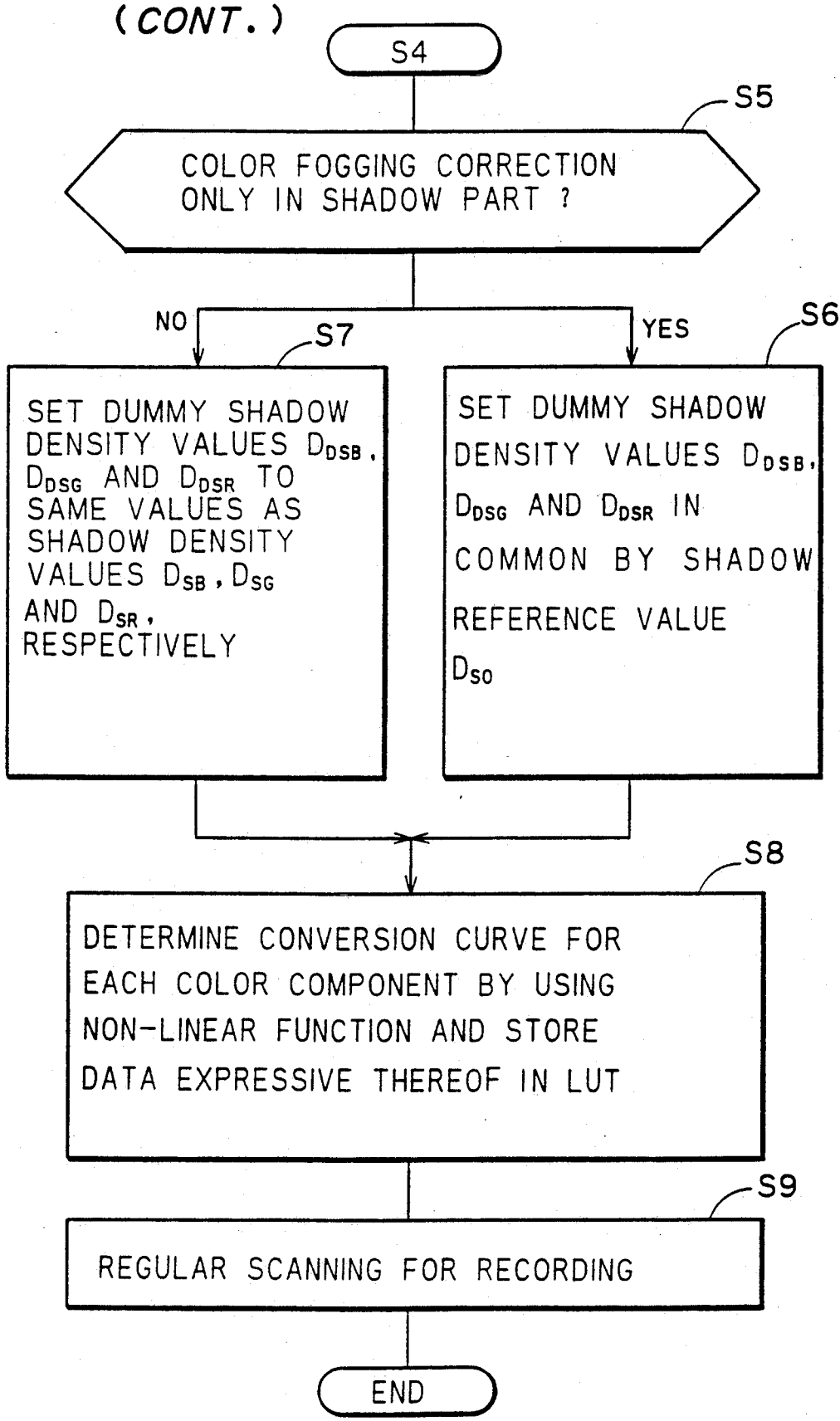
Figure 3B:
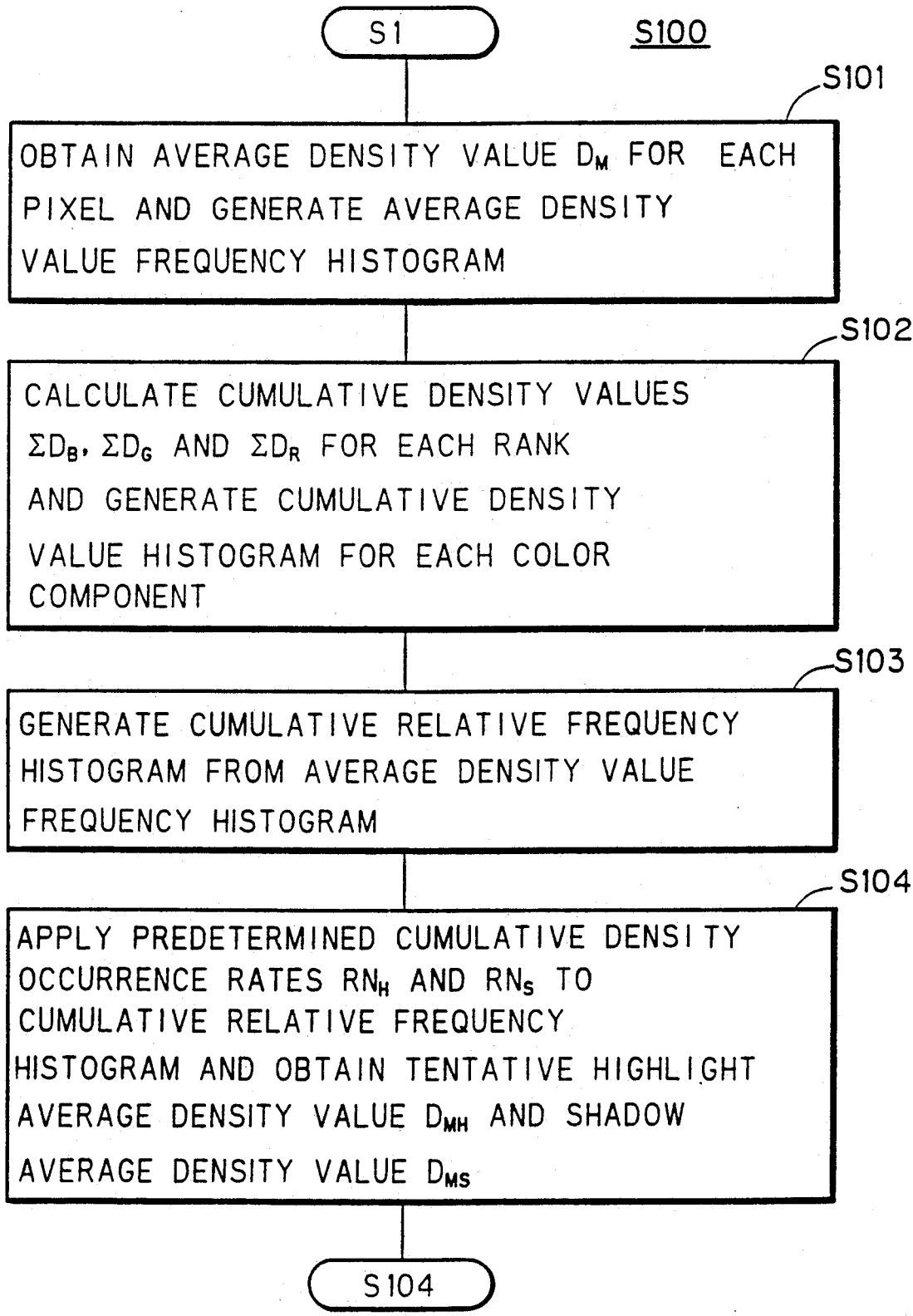
Figure 3B:
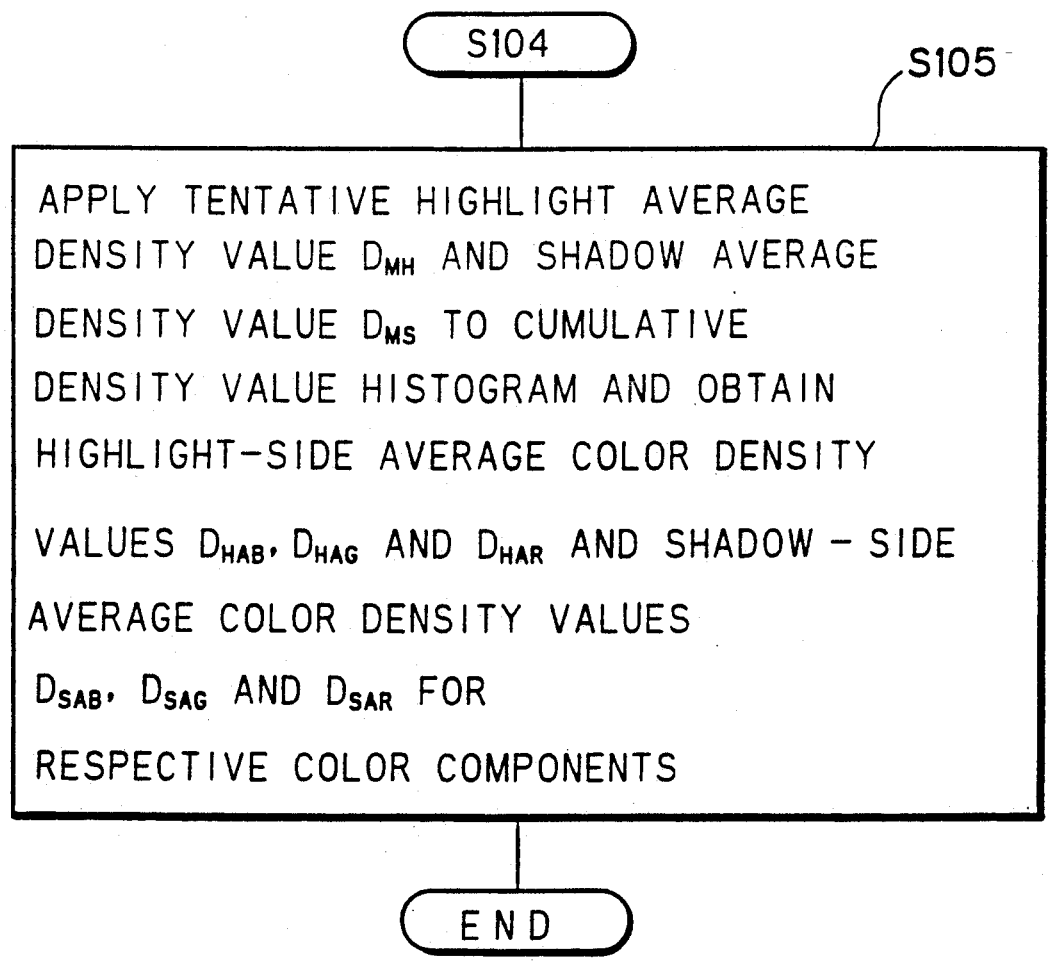
Figure 4:
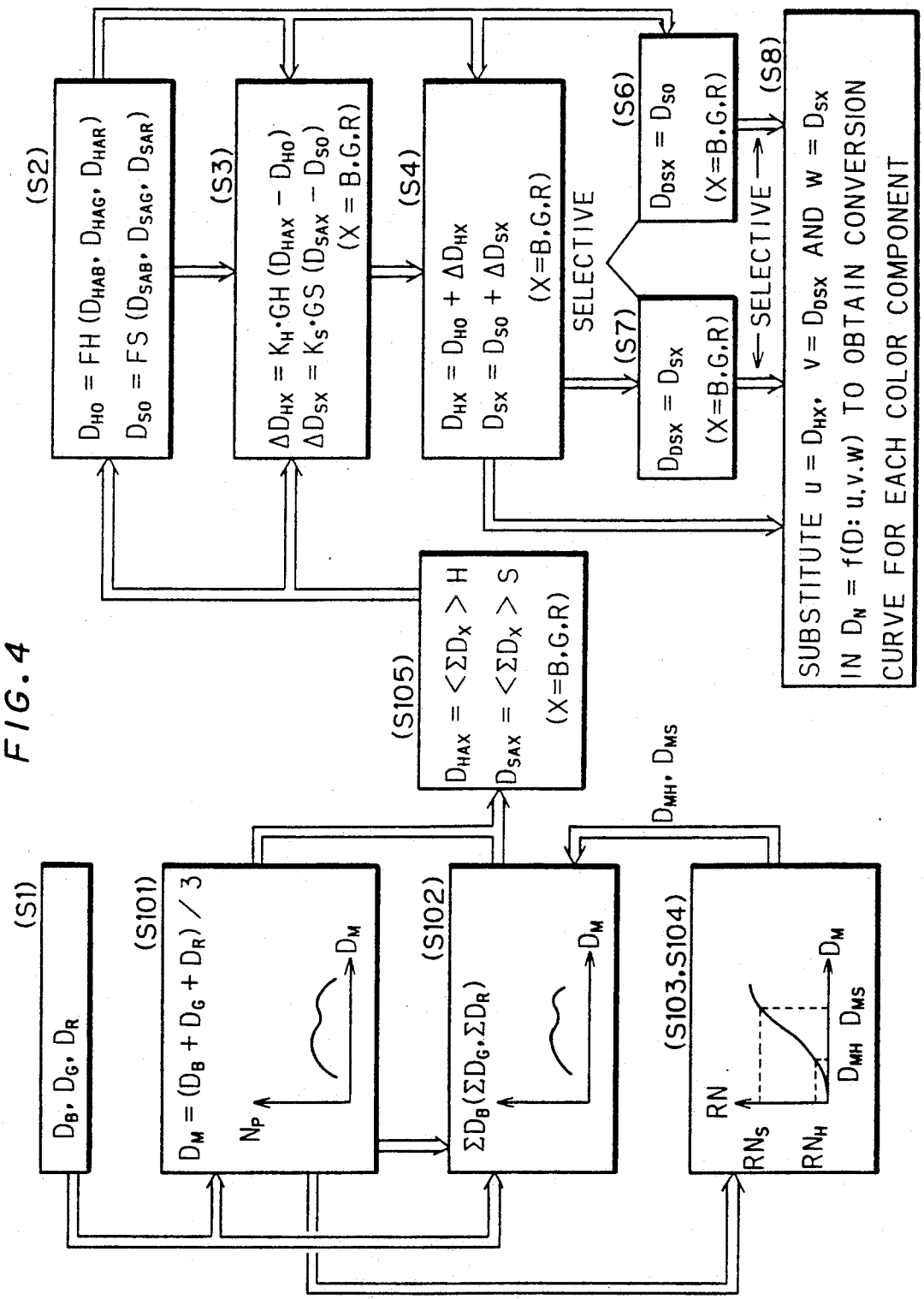
FIG. 4 shows conceptually the procedure of data processings in the first preferred embodiment.

FIGS. 3A and 3B are flow charts showing the operation of the color process scanner 100. This operation is suited for correcting color fogging only in a shadow part. FIG. 4 shows, conceptionally the processes of generating the conversion curves. The reference characters S1, S101, ... and the like in FIG. 4 correspond to the step, illustrated in FIGS. 3A and 3B. Outline arrows in FIG. 4 show flows of data.

Hereinafter, the processes of generating the conversion curves are described in order.

(B-1) Determination of Average Color Density Value

First, in step S1 of (FIG. 3A), the entire original 1 is prescanned, and color density signals $D_B$, $D_G$ and $D_R$ for each pixel (FIG. 2) are stored in the frame memories 13B, 13G and 13R. The color density values that the signals $D_B$, $D_G$ and $D_R$ indicate are designated by the same reference characters $D_B$, $D_G$ and $D_R$ hereinafter. When the size of the original 1 is large, pixels are skipped during the storing of the color density values $D_B$, $D_G$ and $D_R$.

Figure 5:
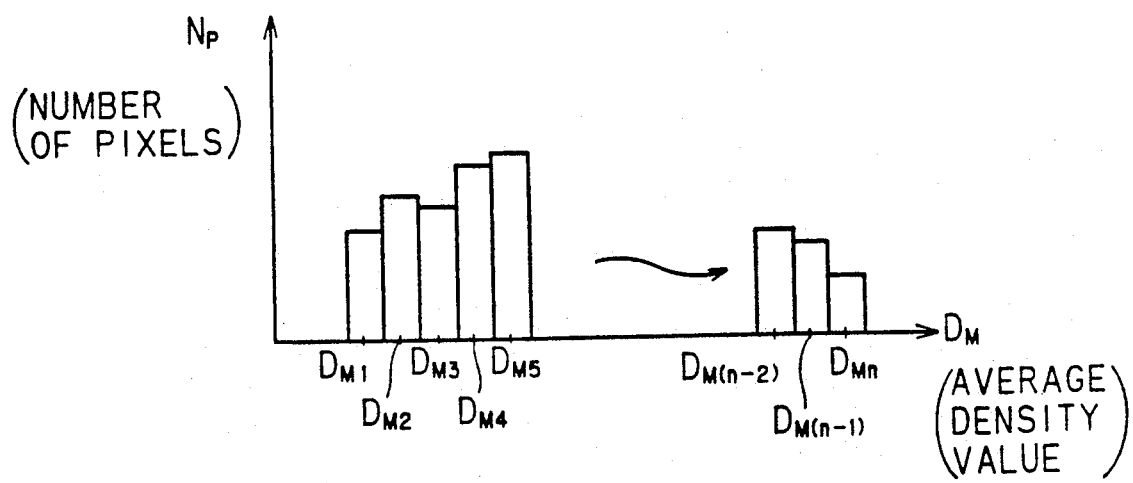
FIG. 5 shows a frequency histogram of average density values.

Step S100 is a subroutine for obtaining highlight-side average color density values $D_{HAB}$, $D_{HAG}$ and $D_{HAR}$ and shadow-side average color density values $D_{SAB}$, $D_{SAG}$ and $D_{SAR}$ from the color density values $D_B$, $D_G$ and $D_R$. Details of step S100 are illustrated in FIG. 3B. In step S101, an average density value:

$$D_M = (D_B + D_G + D_R)/3$$

for each pixel is calculated. This calculation is carried out for all prescanned pixels, and a frequency histogram of average density values is generated. An example of such a histogram is shown in FIG. 5, in which the abscissa expresses ranks indicative of respective ranges of the average density value $D_M$ and the ordinate expresses the numbers of pixels $N_P$ belonging to respective ranks. In FIG. 5, the center values of respective ranks are represented by $D_{Mi}$ (i=1 to n).

Figure 6:
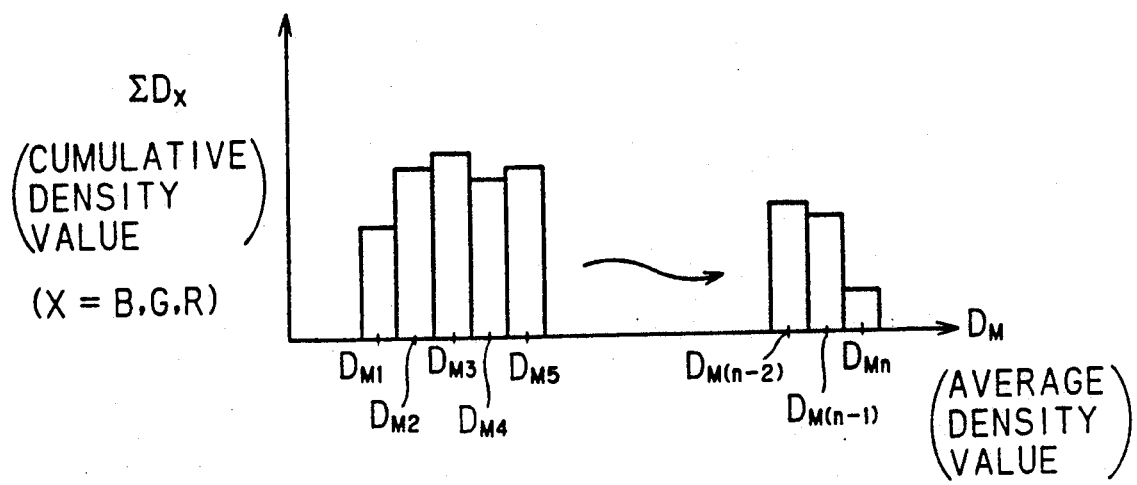
FIG. 6 shows a cumulative density histogram for each color component.

In step S102, the density values $D_B$, $D_G$ and $D_R$ for each of the pixels are cumulatively added in each rank of the frequency histogram of average density values. This process is executed for each rank independently. After this calculation, a cumulative density histogram for each color component is generated, as shown in FIG. 6, for example, in which the abscissa expresses rank values $D_{Mi}$ (i=1 to n) and the ordinate expresses cumulative density values $\epsilon D_B$, $\epsilon D_G$ and $\epsilon D_R$ corresponding to the pixels included in the respective ranks. Such a cumulative density histogram is generated for each of X=B, G and R.

As an example, the rank having a rank value of $D_{Mi}=1.0$ and a rank width of 0.1 ($0.95 \leq D_M \leq 1.05$) is supposed. For convenience, it is assumed that the number of pixels included in this rank is three, and the density data of the respective pixels are as follows:

pixel 1: $D_B=1.10$, $D_G=0.90$, $D_R=0.95$ ($D_M \approx 0.98$)
pixel 2: $D_B=1.00$, $D_G=1.10$, $D_R=0.90$ ($D_M \approx 1.00$)
pixel 3: $D_B=1.00$, $D_G=0.95$, $D_R=0.95$ ($D_M \approx 0.97$)

When "X" is B (blue) in the cumulative density histogram shown in FIG. 6, the cumulative density value $\epsilon D_B$ in the rank ($0.95 \leq \epsilon D_M < 1.05$) is calculated as follows:

$$\epsilon D_B = 1.10 + 1.00 + 1.00 = 3.10$$

The other cumulative density values $\epsilon D_G$ and $\epsilon D_R$ are similarly calculated as follows:

$$\epsilon D_G = 0.90 + 1.10 + 0.95 = 2.95$$

$$\epsilon D_R = 0.95 + 0.90 + 0.95 = 2.80$$

Such process is executed for each rank, so that a cumulative density histogram is obtained for each color component B, G and R. (See the block of process step S102 in FIG. 4. In FIG. 4, each histogram is drawn approximately by a curve. The process steps S101 and S102 are practically executed in parallel.)

Figure 7:
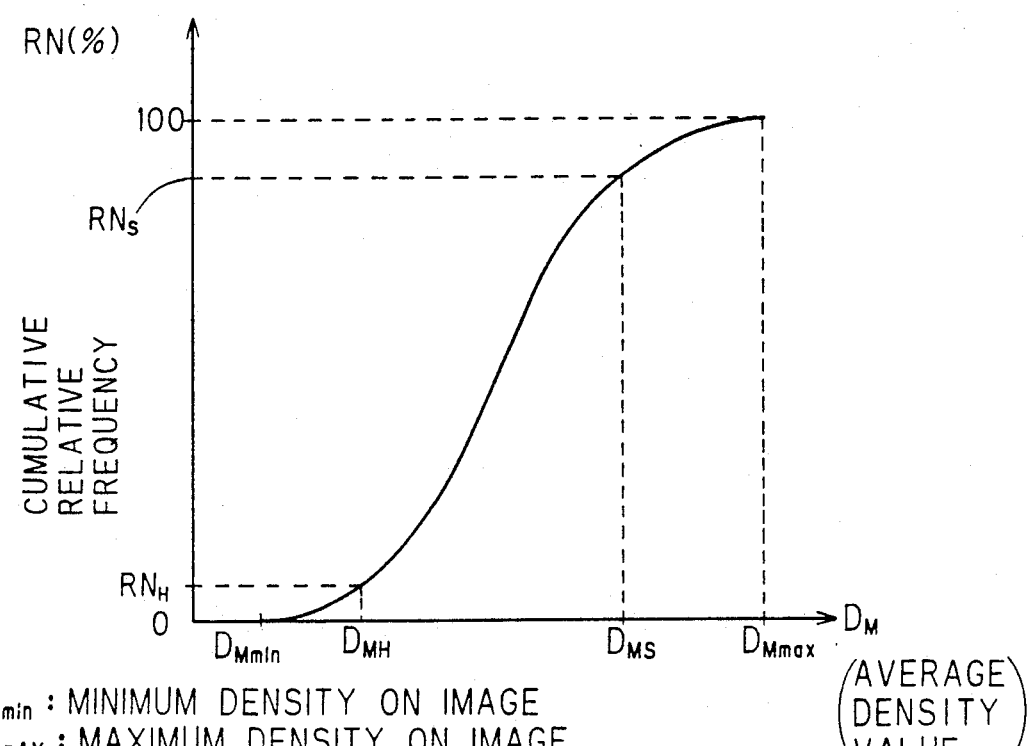
FIG. 7 shows a cumulative relative frequency histogram.

In step S103, a cumulative relative frequency histogram. An example of a cumulative relative frequency histogram is illustrated is generated from the frequency histogram average density values shown in FIG. 5. FIG. 7, in which the abscissa expresses the rank values $D_{Mi}$ (i=1 to n) and the ordinate expresses the relative frequency RN (%) of pixels cumulatively added from the low density side. The histogram values increase from 0% to 100% in the range from a minimum density value $D_{Mmin}$ to a maximum density value $D_{Mmax}$ appearing on the original image. In FIG. 7, the cumulative relative frequency histogram is approximated by a curve on the condition that the rank width is sufficiently small.

In step S104, predetermined values of cumulative density occurrence rates $RN_H$ and $RN_S$ are applied to the cumulative relative frequency histogram shown in FIG. 7 to determine a tentative highlight average density value $D_{MH}$ and a tentative shadow average density value $D_{MS}$, respectively. The cumulative density occurrence rates $RN_H$ and $RN_S$ are predetermined by analyzing a large number of sample originals as values for statistically providing optimum highlight and shadow points, which are, for example, 1% and 98%, respectively.

Figure 8:
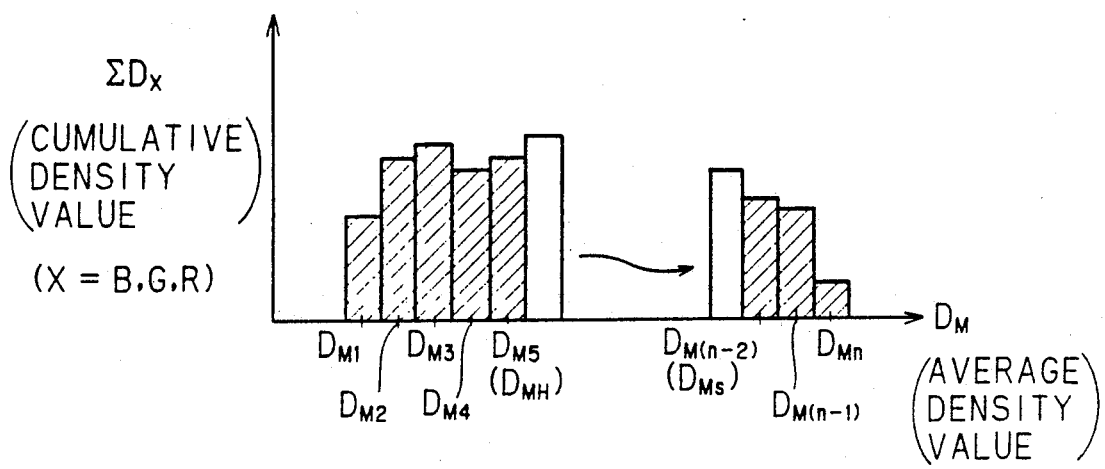
FIG. 8 shows a histogram for explaining processes of calculating an average color density value from parts of the histogram of FIG. 5.

In step S105, noting the region of less than the tentative highlight average density value $D_{MH}$ on the highlight side ($D_{Mmin} \leq D_M \leq D_{MH}$) and the region of more than the tentative shadow average density value $D_{MS}$ on the shadow side ($D_{MS} \leq D_M \leq D_{Mmax}$) as shown by oblique hatching of FIG. 8 in the cumulative density value histogram for each color component typically shown in FIG. 6, the cumulative density values $\epsilon D_B$, $\epsilon D_G$ and $\epsilon D_R$ within these ranges are averaged for each color component using respective numbers of pixels belonging thereto.

If the average per pixel on the highlight side is represented by $<\ldots>_H$ and the average per pixel on the shadow side is represented by $<\ldots>_S$, the highlight side average color density values $D_{HAB}$, $D_{HAG}$ and $D_{HAR}$ and the shadow-side average color density values $D_{SAB}$, $D_{SAG}$ and $D_{SAR}$ obtained through the above-indicated process step are as follows:

$$D_{HAX} = <\epsilon D_X>_H \quad (X = B, G \text{ and } R) \ldots \quad (1)$$

$$D_{SAX} = <\epsilon D_X>_S \quad (X = B, G \text{ and } R) \ldots \quad (2)$$

For example, when "X" in FIG. 8 is "B" and the highlight density value $D_{MH}$ is $D_{M5}$, $$D_{HAB} = (D_{M1} + D_{M2} + D_{M3} + D_{M4} + D_{M5})/(N_{P1} + N_{P2} + N_{P3} + N_{P4} + N_{P5})$$

is obtained, where $N_{Pi}$ (i=1 to 5) is the number of pixels whose average density values $D_M$ belong to the rank $D_{Mi}$ and is found from the histogram of FIG. 5.

Thus the highlight-side and shadow-side average color density values $D_{HAX}$ and $D_{SAX}$ (X = B, G and R) for each color component shown in FIG. 4 in the center can be obtained. This completes subroutine step S100, and the process returns to the main routine illustrated in FIG. 3A.

(B-2) Calculation of Reference Values and Amount of Correction

In step S2 (FIG. 3A), a highlight reference value $D_{HO}$ and a shadow reference value $D_{SO}$ which are common to the respective color components of B, G and R are found in accordance with the following equations (4) and (5):

$$D_{HO} = FH(D_{HAB}, D_{HAG}, D_{HAR}) \ldots \quad (4)$$

$$D_{SO} = FS(D_{SAB}, D_{SAG}, D_{SAR}) \ldots \quad (5)$$

where functions FH and FS are defined as follows:

$$FH(D_{HAB}, D_{HAG}, D_{HAR}) = \quad (6a)$$
$$r_H \cdot MIN(D_{HAB}, D_{HAG}, D_{HAR}) + (1 - r_H)D_{HF}$$

$$FS(D_{SAB}, D_{SAG}, D_{SAR}) = \quad (6b)$$
$$r_S \cdot MAX(D_{SAB}, D_{SAG}, D_{SAR}) + (1 - r_S)D_{SF}$$

where:

MIN( ... ) is a calculation for selecting a minimum value therein,

MAX( ... ) is a calculation for selecting a maximum value therein, $D_{HF}$ and $D_{SF}$ are predetermined standard highlight and shadow density values, and $r_H$ and $r_S$ are constants preselected in the ranges of $0 < r_H < 1$ and $0 < r_S < 1$.

That is, the highlight reference value $D_{HO}$ is a weighted average of the minimum value of $D_{HAX}$ (X = B, G and R) and the standard value $D_{HF}$, and the shadow reference value $D_{SO}$ is a weighted average of the maximum value of $D_{SAX}$ (X = B, G and R) and the standard value $D_{SF}$. The functions FH and FS may be functions for obtaining averages of $D_{HAX}$ (X = B, G and R) and $D_{SAX}$ (X = B, G and R) respectively.

In step S3, gray balance correction amounts $\Delta D_{HX}$ (X = B, G and R) in the highlight part and gray balance correction amounts $\Delta D_{SX}$ (X = B, G and R) in the shadow part are found in accordance with the following equations (7a) and (7b):

$$\Delta D_{HX} = K_H \cdot GH(D_{HAX} - D_{HO}) \quad (X = B, G \text{ and } R) \ldots \quad (7a)$$

$$\Delta D_{SX} = K_S \cdot GS(D_{SAX} - D_{SO}) \quad (X = B, G \text{ and } R) \ldots \quad (7b)$$

where:

$K_H$ and $K_S$ are experimentally predetermined positive constants. The functions GH and GS are defined, for example, by the following equations:

$$GH(D_{HAX} - D_{HO}) = \quad (8)$$
$$(D_{HAX} - D_{HO})/[1 + \{(D_{Hmax} - D_{Hmin})/A_H\}^m]$$

$$GS(D_{SAX} - D_{SO}) = D_{SAX} - D_{SO} \quad (9)$$

where:

$$D_{Hmax} = MAX(D_{HAB}, D_{HAG}, D_{HAR}) \ldots \quad (10a)$$

$$D_{Hmin} = MIN(D_{HAB}, D_{HAG}, D_{HAR}) \ldots \quad (10b)$$

$A_H$ is a preselected positive constant, and
m is a preselected positive constant (e.g., "3").

As understood from the equations (6a) to (9), the correction amounts $\Delta D_{HX}$ in the highlight part and the correction amounts $\Delta D_{SX}$ in the shadow part are proportional to $(D_{HAX}-D_{HO})$ and $(D_{SAX}-D_{SO})$ respectively. The values $(D_{HAX}-D_{HO})$ and $(D_{SAX}-D_{SO})$ reflect color fogging amounts in the highlight part and in the shadow part respectively.

When the gray balance correction amounts $\Delta D_{HX}$ in the highlight part are noted, according to the equations (7), (8), (10a) and (10b), the larger the distribution width:

$$\Delta D_{Hm} \equiv D_{Hmax} - D_{Hmin} \ldots \quad (11)$$

of the average density values of the respective color components of B, G and R in the highlight part, the smaller the gray balance correction amounts $\Delta D_{HX}$. Consequently, when no highlight point is present in the original 1, the gray balance correction amounts in the highlight part can be prevented from growing more than necessary. The constant $A_H$ is a threshold for determining whether a highlight point is present or absent and the aforesaid suppression in correction is enhanced when the following condition is satisfied:

$$\Delta D_{Hm} > A_H \ldots \quad (12)$$

(B-3) Calculation of Highlight Density Values, Shadow Density Values and Dummy Shadow Density Values In the process step S4, by the use of the reference values $D_{HO}$ and $D_{SO}$ and the correction amounts $\Delta D_{HX}$ and $\Delta D_{SX}$ (X = B, G and R), highlight density values $D_{HX}$ and shadow density values $D_{SX}$ (X = B, G and R) are calculated according to the following equations (13) and (14):

$$D_{HX} = D_{HO} + \Delta D_{HX} \; (X = B, G \text{ and } R) \ldots \quad (13)$$

$$D_{SX} = D_{SO} + \Delta D_{SX} \; (X = B, G \text{ and } R) \ldots \quad (14)$$

In step S5, an operator judges whether or not the original requires the color fogging correction only in the shadow part. It is not easy to directly judge the color fogging only in the shadow part through visual observation of the original image. Therefore, it is more practical that there is operator judges whether the global discoloring of the original 1, and determines there is color fogging only in the shadow part when no such global discoloring is found. When it is judged that a color fogging only in the shadow part is present, the process proceeds to step S6. In step S6, dummy shadow density values $D_{DSX}$ (X = B, G and R) are made equal to the shadow reference value $D_{SO}$ according to the following equation:

$$D_{DSB} = D_{DSG} = D_{DSR} = D_{SO} \ldots \quad (15)$$

On the other hand, when the original 1 is globally discolored the process proceeds to step S7. In step S7 the dummy shadow density values $D_{DSX}$ (X = B, G and R) are made equal to the shadow density values $D_{SX}$ (X = B, G and R) of the corresponding color components according to the following equation:

$$D_{DSX} = D_{SX} \; (X = B, G \text{ and } R) \ldots \quad (16)$$

In step S7, the dummy shadow density values $D_{DSX}$ need not be made completely equal to the shadow density values $D_{SX}$, but may be set to values which are approximate to $D_{SX}$.

(B-4) Generation of Conversion Curve

In step S8, a conversion curve for each color component is specified as a function of the highlight density values $D_{HX}$, the shadow density values $D_{SX}$ and dummy shadow density values $D_{DSX}$ (X = B, G and R). For this purpose, a nonlinear conversion function f defined by the following expressions (17) to (19) is predetermined and data expressing this function f is stored in the memory 16:

$$D_N = f(D; u, v, w) \quad (17)$$

$$= p + (p - q)\log_{10}[g_1 + g_2]$$

$$g_1 \equiv 10^{-(D-u)/(v-u)} \quad (18)$$

$$g_2 \equiv 0.1 - 10^{-(w-u)/(v-u)} \quad (19)$$

where:

p and q are constants which are set in the vicinity of the lower and upper limits of a normalized density range before masking operation, respectively, D is a density value before conversion, $D_N$ is a density value after conversion, and u, v and w are parameters.

The constants p and are predetermined for each color component. The following parameter values u, v and w:

$$u = D_{HX}, \; v = D_{DSX}, \; w = D_{SX} \; (X = B, G \text{ and } R) \ldots \quad (20)$$

are substituted in the expressions (17) to (19) for each color component to specify the conversion characteristic of the function f for each color component.

Figure 9:
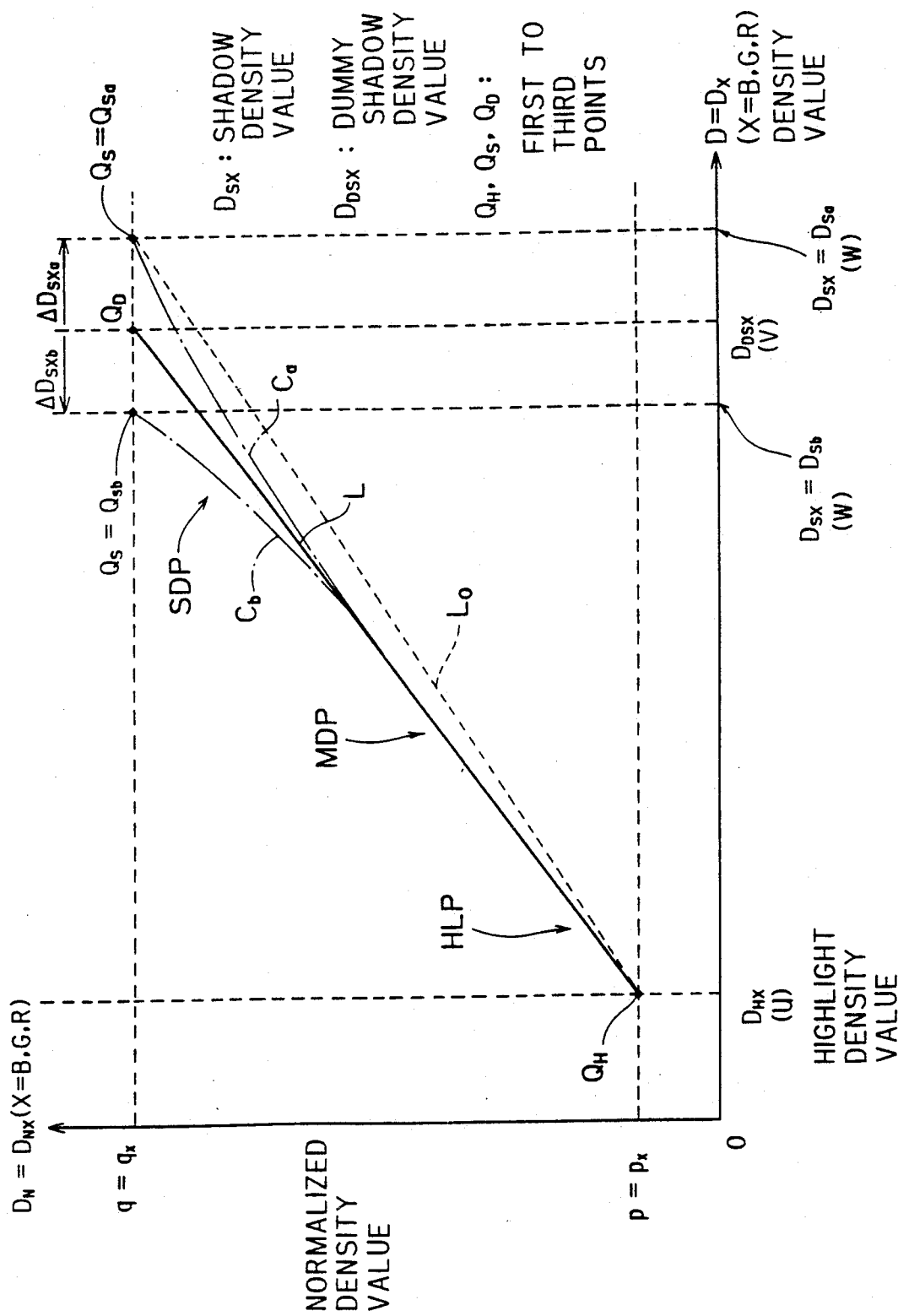
FIG. 9 is a graph illustrating an example of conversion curves generated according to the first preferred embodiment.

FIG. 9 illustrates the function f specified in this manner on a density conversion coordinate plane, where $p_X$ and $q_X$ are the constants p and q for the color components X. A subscript "X" is attached to the density variables $D_X$ and $D_{NX}$ to indicate the correspondence to the color components X. The characteristics of the function f are described later. Examples of the function f are shown in FIG. 9 as curves $C_a$ and $C_b$. The difference between $C_a$ and $C_b$ is also described later.

When the function f is specified for each color component, the CPU 15 generates numerical data expressive of the conversion characteristic of the function f, that is, data expressing numerically the curve $C_a$ of FIG. 9, for example. The data are loaded into the LUTs 5B, 5G and 5R (FIG. 2) for each color component. This completes the preparation steps of the image data conversion.

In step S9 of (FIG. 3A), a regular scanning of the original 1 is carried out for the purpose of practically reproducing the image. Since the operation in the regular scanning has been described, the description thereof is omitted, here. The conversion curves in the LUTs 5B, 5G and 5R generated in the above mentioned manner are used to convert of the signals $D_B$, $D_G$ and $D_R$.

(B-5) Characteristics of Conversion Curves

The above-mentioned expressions (17) to (19) and FIG. 9 are again referred to. According to the expressions (17) to (19), it is found that the function f and accordingly conversion curves thereby generated have the following characteristics (i) to (iv):

(i) The highlight density values $D_{HX}$ are much smaller than the shadow density values $D_{SX}$ and the dummy shadow density values $D_{DSX}$. Therefore the following relation (21) holds in the expression (20):

$$u \ll v, w \ldots \quad (21)$$

Because the differences between the shadow density values $D_{SX}$ and the dummy shadow density values $D_{DSX}$ are relatively small, values v and w are nearly equal to each other. Accordingly, the amount:

$$(w-u)/(v-u) \ldots \quad (22)$$

existing on the right side of the expression (19) is approximately equal to "1", and the second term on the right side of the expression (19) is approximately equal to "0.1". As a result of the subtraction of the second term from the first term on the right side of the expression (19), the absolute value of the amount $g_2$ becomes very small or nearly zero.

On the other hand, when the density value $D (=D_X)$ is equal to the value of the parameter u (that is, the highlight density values $D_{HX}$), the exponent on the right side of the expression (18) is "0" and $g_1$ is "1".

For these reasons, the dominant term of the sum $(g_1+g_2)$ in the expression (17) is $g_1$ and accordingly, $$g_1+g_2 \approx 1 \ldots \quad (23)$$

As a result, $$D_N \approx p \, (=p_X) \ldots \quad (24)$$

That is, $D=D_{HX}$ is substantially converted into $D_N=P_X$ by the function f. The conversion curves $C_a$ and $C_b$ in FIG. 9 substantially pass through a first point $Q_H$ defined by the two dimensional coordinate values $(D_{HX}, p_X)$.

(ii) Suppose that the following equation:

$$D=D_{SX} \text{ (shadow density value)} \ldots \quad (25)$$

holds in the expressions (17) to (19). Because the parameter w coincides with the shadow density values $D_{SX}$ according to the expression (20), the value $g_1$ in the expression (18) and the second term on the right side of the expression (19) are exactly equal to each other. As a result, the value [...] inside of the logarithmic function of the expression (17) is "0.1" and accordingly:

$$D_N=q \, (=q_X) \ldots \quad (26)$$

That is, $D=D_{SX}$ is converted into $D_N=q_X$ by the function f, and the conversion curves $C_a$ and $C_b$ in FIG. 9 pass through a second point $Q_S$ defined by the two-dimensional coordinate values $(D_{SX}, q_X)$ Of the two points $Q_S=Q_{Sa}$ and $Q_S=Q_{Sb}$ shown in FIG. 1, the former is the second point $Q_S$ when the gray balance correction amount $\Delta D_{SX}$ in the shadow part is a positive value $\Delta D_{SXa}$, and the latter is the second point $Q_S$ when the correction amount $\Delta D_{SX}$ is a negative value $\epsilon D_{SXb}$. The density values $D_{SX}=D_{Sa}$ and $D_{Sb}$ before conversion indicate the respective shadow density values in these two cases, and the conversion curves in these cases are shown by the curves $C_a$ and $C_b$ respectively.

(iii) When the density value D is not just equal to the parameter u which is the highlight density values $D_{HX}$, but is relatively approximate thereto, that is, in the highlight part, the absolute value of the exponent on the right side of the expression (18) approximates to "0". The value of $g_1$ accordingly approximates to "1" and is much larger than the value of $g_2$. Therefore the following expression holds:

$$\log_{10}[g_1+g_2] \approx \log_{10}[g_1] = -(D-u)/(v-u) \quad (27)$$

Thus, the function f in the highlight part can be approximated to:

$$D_N \approx p-(p-q)(D-u)/(v-u) \ldots \quad (28)$$

The expression:

$$D_N = p-(p-q)(D-u)/(v-u) \ldots \quad (29)$$

is an equation expressing a straight line L (see FIG. 9) which passes through the first point $Q_H$ determined in accordance with the highlight density value $D_{HX}(=u)$ and a third point:

$$QD=(D_{DSX}, q_X) \ldots \quad (30)$$

determined in accordance with the dummy shadow density value $D_{DSX}(=v)$. In the highlight part HLP of FIG. 9, the conversion curves $C_a$ and $C_b$ extend along the straight line L.

On the other hand, as described in section (ii), the conversion curves $C_a$ and $C_b$ pass though the second point $Q_S$, and the position of the second point $Q_S$ is different from that of the third point $Q_D$ in the example shown in FIG. 9. The conversion curves $C_a$ and $C_b$ accordingly deviate from the straight line L in the shadow part SDP. The larger the density value D, the larger the deviation amount. The deviation amount in the middle density part MDP is larger than that in the highlight part HLP and is not so large as that in the shadow part SDP. Since the deviation amount in the shadow part SDP is set to a value corresponding to the color fogging amount only in the shadow part of the original 1, the conversion curves (illustrated by the curves $C_a$ and $C_b$ of FIG. 9 in this preferred embodiment) are of eliminating the color fogging only in the shadow part without losing the gray balance in the low and middle density regions.

(iv) As described above, the shadow density values $D_{SX}$ and the dummy shadow density values $D_{DSX}$ are set equally when the color fogging only in the shadow part is absent and, for example, the original 1 is globally discolored. A conversion curve at this time can be expressed by the same equation as the equation (29) by substituting v=w in the expressions (17) to (19). That is, the conversion curve at this time is a straight line passing through the first point $Q_H$ and the second point $Q_S$ $(=Q_{Sa}$ or $Q_{Sb})$. A straight line $L_O$ indicated in FIG. 9 corresponds to the case where the second point $Q_S$ is $Q_{Sa}$. The normalization conversion characteristic represented by the straight line $L_O$ is such that the density of a specific color component is restrained in the highlight part HLP, the middle density part MDP and the shadow part SDP to ensure the gray balance among the respective color components, and accordingly, the global discoloring on the original 1 can be corrected.

The nonlinear function f used in this preferred embodiment is effective for both color fogging correction only in the shadow part and correction of global discoloring on the original 1. When the original 1 has no color fogging and no discoloring, the shadow density values $D_{SX}$ and the dummy shadow density values $D_{DSX}$ are set equally such that the function f is a straight line. The function f is effective also for this case.

C. Second Preferred Embodiment

Figure 10:
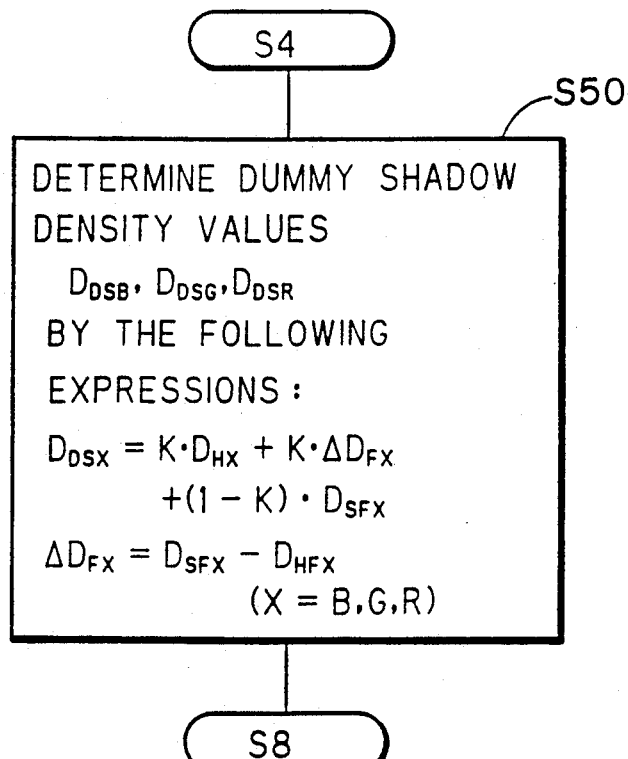
FIG. 10 is a flow chart showing a part of the process of a second preferred embodiment of the present invention.

A second preferred embodiment of the present invention is executable regardless of color fogging correction. The basic structure of a color process scanner to which the second preferred embodiment is applied is similar to that of the scanner 100 shown in FIGS. 1 and 2. The only differences between of the second and first embodiments are in terms of the conversion curves generated in the data processor 14. In the second embodiment, the highlight density values $D_{HX}$ and the shadow density values $D_{SX}$ (X=B, G and R) for the original 1 to be reproduced are provided in steps S1 to S4 (FIG. 3A). Thereafter the process step S50 FIG. 10 is carried out instead of steps S5 to S7.

For execution of step S50, highlight density values $D_{HFX}$ and shadow density values $D_{SFX}$ for a standard original are previously specified. The standard original is an original having tone and gradation which are experientially considered to be standard. When a photograph or the like is employed as an original to be reproduced, a photograph previously confirmed that the same has been obtained under a proper exposure of an image is used as a standard original. Highlight and shadow density values for each color component which have been experimentally found with respect to the standard original are taken as $D_{HFX}$ and $D_{SFX}$, respectively.

In step S50, by the use of the thus determined standard highlight density values $D_{HFX}$ and standard shadow density values $D_{SFX}$, dummy shadow density values $D_{DSX}$ (X=B, G and R) are determined according to the following expression (31):

$$D_{DSX} = K \cdot D_{HX} + K \cdot \Delta D_{FX} + (1-K) \cdot D_{SFX} \quad (X=B, G \text{ and } R) \ldots \quad (31)$$

where $\Delta D_{FX}$ is determined by the following expression (32):

$$\Delta D_{FX} = D_{SFX} - D_{HFX} \quad (X=B, G \text{ and } R) \ldots \quad (32)$$

and corresponds to the density range width for each color component in the standard original (hereinafter referred to as a "standard density range width"), and K is a predetermined constant which satisfies:

$$0 \leq K \leq 1 \ldots \quad (33)$$

The expression (31) means that a value:

$$K \cdot \Delta D_{FX} + (1-K) \cdot D_{SFX} \ldots \quad (34)$$

which is proportional to the standard density range width $\Delta D_{FX}$ and a value:

$$K \cdot D_{HX} \ldots \quad (35)$$

which is proportional to the highlight density value $D_{HX}$ of the original 1 to be reproduced are added to determine the dummy shadow density values $D_{DSX}$. From another viewpoint, the standard density range width $\Delta D_{FX}$ and the standard shadow density value $D_{SFX}$ are weight averaged by using a weight coefficient K, and the values of expression (34) thereby obtained are added to values of the expression (35) to provide the dummy shadow density value $D_{DSX}$. The advantages of determining the dummy shadow density values $D_{DSX}$ in this manner are described later.

When step S50 of FIG. 10 is completed, a conversion curve is generated for each color component (step S8g FIG. 3A). While carrying out the normalization density conversion by the use of the conversion curve for each color component, the original 1 to be reproduced is regularly scanned (step S9). The recording of a halftone dot image in the second embodiment is similar to that in the first embodiment.

Figure 11:
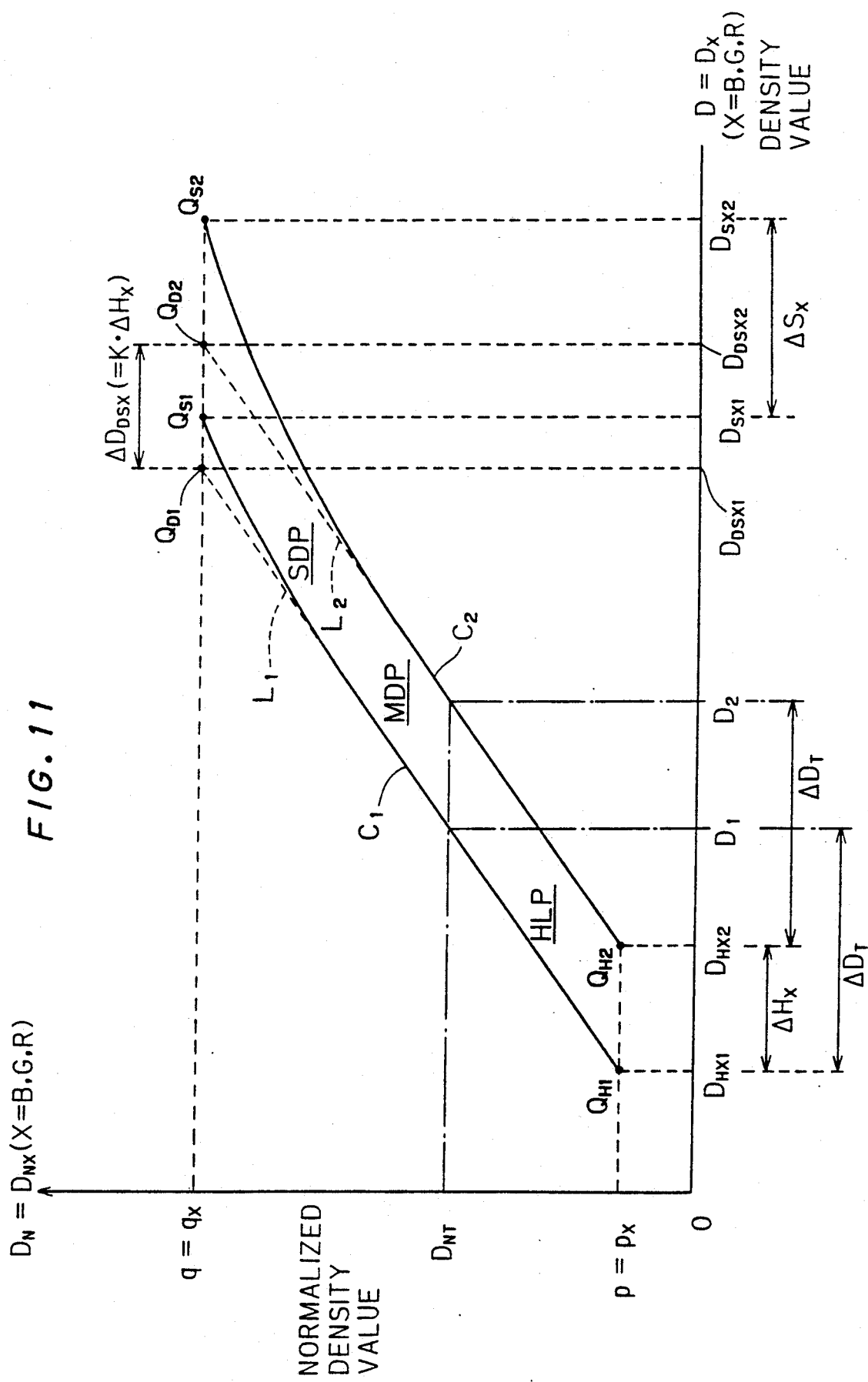
FIG. 11 is a graph illustrating an example of conversion curves generated according to the second preferred embodiment.

FIG. 11 show two conversion curves $C_1$ and $C_2$ determined according to the second embodiment. The first conversion curve $C_1$ corresponds to the case where the highlight density values $D_{HX1}$ and the shadow density values $D_{SX1}$ are small, and the second conversion curve $C_2$ corresponds to the case where the highlight density values $D_{HX2}$ and the shadow density values $D_{SX2}$ are large. That is, these two conversion curves $C_1$ and $C_2$ correspond to the two types of originals to be reproduced.

Similarly to the first preferred embodiment, the non-linear conversion function f defined by the expressions (17) to (19) is used, and thereby the first conversion curve $C_1$ extends along a straight line $L_1$ connecting a highlight point $Q_{H1}$ and a dummy shadow point $Q_{D1}$ in the highlight part HLP and the middle density part MDP. The curve $C_1$ passes through a shadow point $Q_{S1}$. Likewise, the second conversion curve $C_2$ extends along a straight line $L_2$ connecting a highlight point $Q_{H2}$ and a dummy shadow point $Q_{D2}$ in the highlight part HLP and the middle density part MDP, and deviates from the straight line $L_2$ to pass through a shadow point $Q_{S2}$ in the shadow part SDP.

The difference between the two highlight density values $D_{HX1}$ and $D_{HX2}$ is taken as $\Delta H_X$, as set forth in the following equation (36):

$$\Delta H_X = D_{HX2} - D_{HX1} \ldots \quad (36)$$

On the other hand, the equation (31) is applied to the first and second conversion curves $C_1$ and $C_2$ respectively, and thereby the following equations (37) and (38) are obtained:

$$D_{DSX1} = K \cdot D_{HX1} + K \cdot \Delta D_{FX} + (1-K) \cdot D_{SFX} \ldots \quad (37)$$

$$D_{DSX2} = K \cdot D_{HX2} + K \cdot \Delta D_{FX} + (1-K) \cdot D_{SFX} \ldots \quad (38)$$

When the difference between the two dummy shadow density values $D_{DSX1}$ and $D_{DSX2}$ is $\Delta D_{DSX}$, the following expression (39) is obtained from the equations (37) and (38):

$$\Delta D_{DSX} = D_{DSX2} - D_{DSX1} \quad (39)$$
$$= K \cdot (D_{HX2} - D_{HX1})$$

By combining expressions (36) and (39), the following proportional relationship (40) is obtained:

$$\Delta D_{DSX} = K \cdot \Delta H_X \ldots \quad (40)$$

The following can be recognized from the equation (40). The mutual distance $\Delta D_{DSX}$ between the dummy shadow points $Q_{D1}$ and $Q_{D2}$ is K times the mutual distance $\Delta H_X$ between the two highlight points $Q_{H1}$ and $Q_{H2}$. Especially when K=1, these mutual distances $\Delta D_{DSX}$ and $\Delta H_X$ are equal to each other, and accordingly the straight lines $L_1$ and $L_2$ are parallel to each other. This property holds independently of a mutual distance $\Delta S_X$ between the two shadow points $D_{SX1}$ and $D_{SX2}$.

Suppose an arbitrary positive value $\Delta D_T$ which is not so large is now considered. A density value obtained by converting by the first conversion curve $C_1$ a density value $D_1$ (see FIG. 11) which is larger than the first highlight density value $D_{HX1}$ by the value $\Delta D_T$ is represented by $D_{NT}$. Because the straight lines $L_1$ and $L_2$ are parallel to each other as above-mentioned, a density value obtained by converting by the second conversion curve $C_2$ a density value $D_2$ which is larger than the second highlight density value $D_{HX2}$ by the same value $\Delta D_T$ results in being equal to $D_{NT}$.

Therefore if the normalization conversion according to this preferred embodiment is executed for a plurality of originals to be reproduced having different density ranges respectively, proper reproduced images can be constantly attained independently of the difference in density range. The condition that the conversion curves $C_1$ and $C_2$ pass through the respective inherent shadow points $Q_{S1}$ and $Q_{S2}$ in the shadow part SDP is satisfied, and thereby the normalization conversion having preferable property over the full range of the density values can be executed.

When the constant K is smaller than "1", the straight lines $L_1$ and $L_2$ of FIG. 11 are not completely parallel but are approximately parallel. In this case, the density values $D_1$ and $D_2$ of FIG. 11 are converted into the values which are not completely equal to but are relatively approximate to each other by the normalization conversion.

Figure 12:
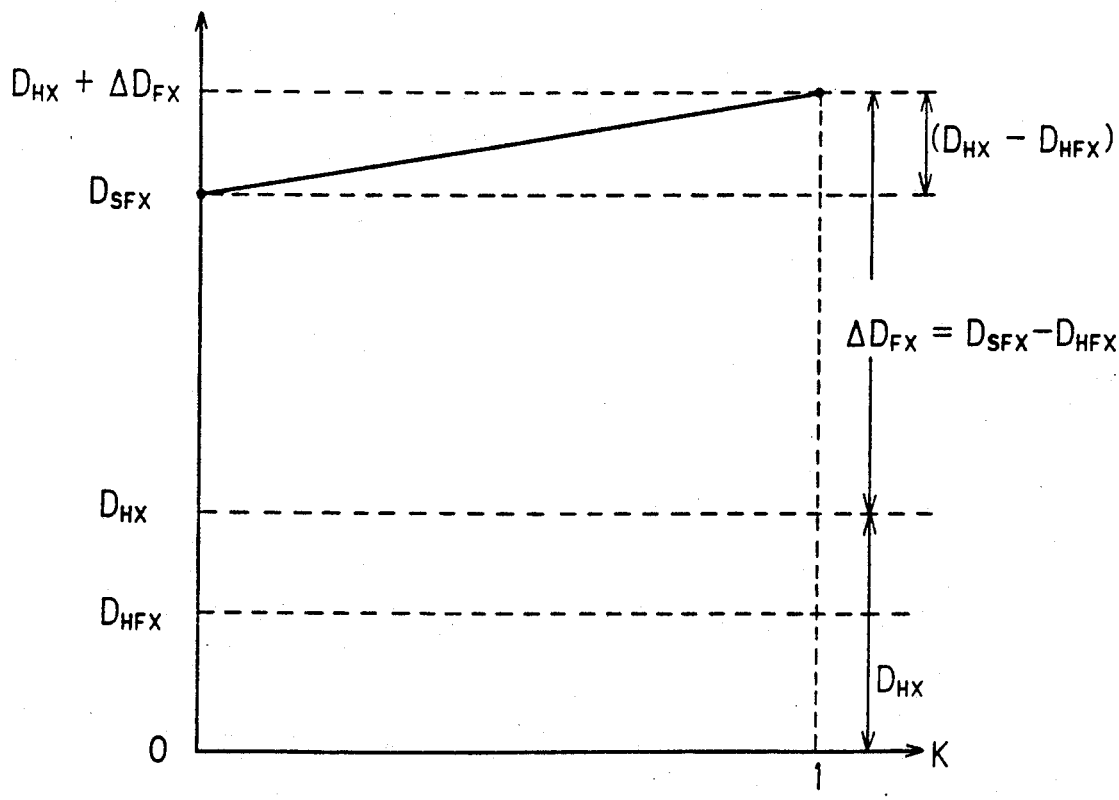
FIG. 12 is a graph showing dependence of a dummy shadow density value on a weight coefficient for calculating a weighted average.

FIG. 12 is a graph in which a solid line shows the variation in the dummy shadow density values $D_{DSX}$ according to variation of the constant K. This graph is obtained from equation (31). When $K=0$, the dummy shadow density value $D_{DSX}$ agrees with the standard shadow density value $D_{SFX}$. Since the standard shadow density value $D_{SFX}$ is constant independently of the image of the original 1 to be reproduced, the dummy shadow density value $D_{DSX}$ which is common to all of the originals 1 to be reproduced is set. As the constant K increases, the dummy shadow density value $D_{DSX}$ increases linearly. When $K=1$, the dummy shadow density value $D_{DSX}$ is the sum of the highlight density value $D_{HX}$ and the standard density range width $\Delta D_{FX}$ of the original 1 to be reproduced as described above. When the coefficient K is equal to "1" or is approximate thereto (e.g., 0.5 or more), the dummy shadow density value $D_{DSX}$ varies considerably in accordance with the highlight density value $D_{HX}$ of the original 1. When the coefficient K is 0.5 or less, the dummy shadow density value $D_{DSX}$ approximates to the standard shadow density value $D_{SFX}$ and the dependence on the highlight density value $D_{HX}$ of the original 1 is suppressed. By specifying the value of the coefficient K arbitrarily, the property of the conversion curves $C_1$ and $C_2$ can be changed.

Thus the conversion curve which considered to be preferable can by experience be generated automatically by the use of a small number of parameters.

D. Modifications

Figure 13:
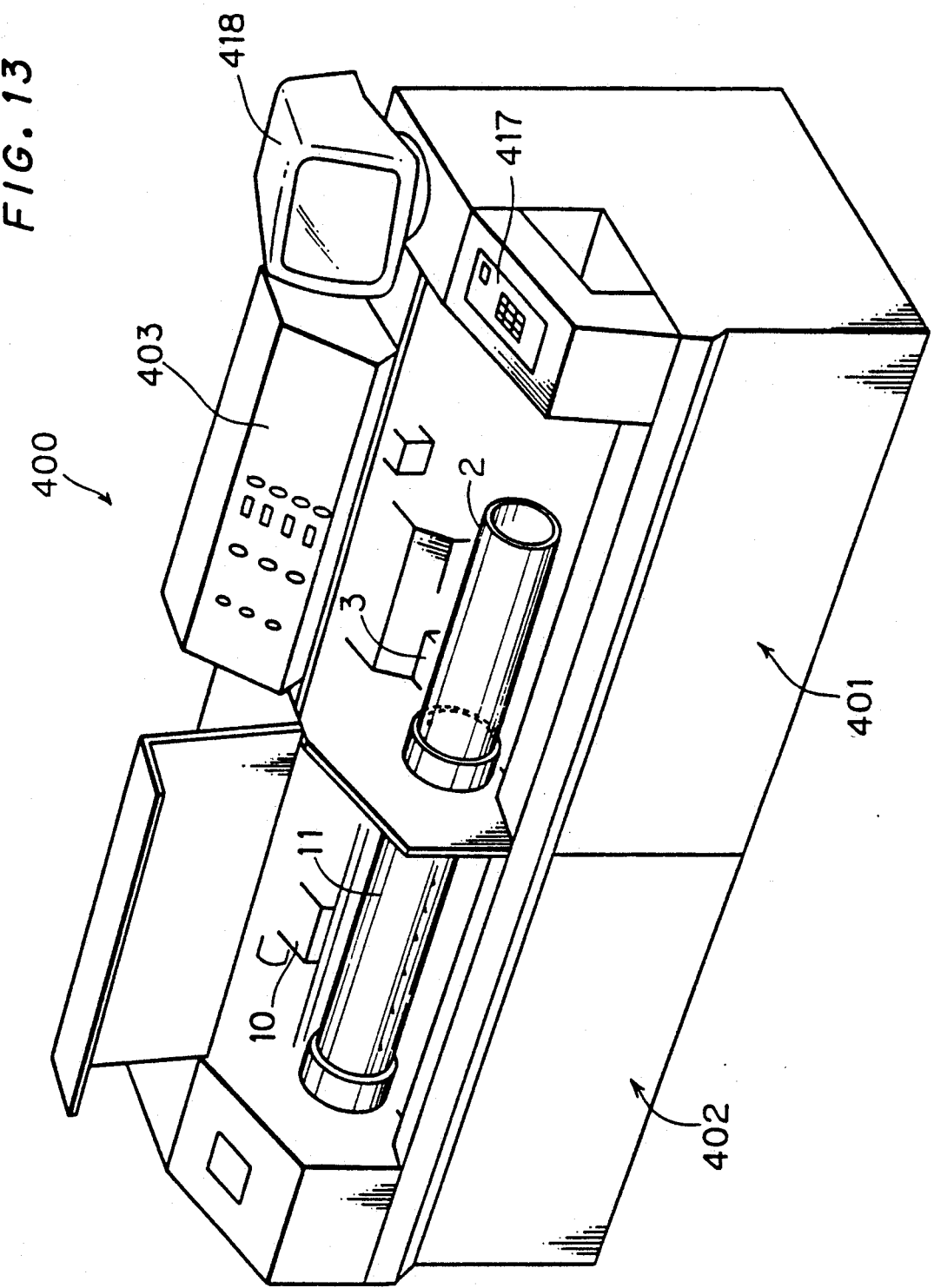
FIG. 13 is an external view showing another example of color process scanners according to the present invention.

[1] FIG. 13 shows a color process scanner 400 having a scanner unit and a color separation auxiliary device integrated into one unit. The scanner 400 also comprises an input unit 401 and an output unit 402. An operation panel 403 is mounted on the input unit 401. Each circuit inside the color separation auxiliary device 300 of FIG. 1 is contained in the body of the input unit 401 in FIG. 13. A CRT 418 and an operation panel 417 of FIG. 13 correspond to the CRT 18 and the console 17 of FIG. 1, respectively. The function and operation of the scanner 400 are substantially similar to those of the scanner of FIG. 1. The scanner 400, however, need not be provided with a color separation auxiliary device separately, hence being relatively compact.

[2] For generation of the conversion curves, another nonlinear function than the above-mentioned function f is also usable. In general, when it is assumed that a function $f_1(D)$ expresses a straight line L and a function $f_2(D)$ is such a function as to increase or decrease monotonously with the variable D increasing satisfy the following expressions are substantially satisfied:

$$f_2(D_{HX}) = 0 \ldots \quad (41)$$

$$f_1(D_{SX}) + f_2(D_{SX}) = q_X \ldots \quad (42)$$

The following function:

$$f_1(D) + f_2(D) \ldots \quad (43)$$

which is obtained by combining the function $f_1(D)$ the function $f_2(D)$ meets the requirement of the present invention.

The function f in the expression (17) corresponds to an expression obtained by substituting the following expressions in the equation (43):

$$f_1(D) = p - (p-q)(D-u)/(v-u) \ldots \quad (44)$$

$$f_2(D) = (p-q)\log_{10}[1 + g_2/g_1] \ldots \quad (45)$$

where $g_1$ and $g_2$ are functions defined by the expressions (18) and (19).

[3] The normalization conversion is carried out by using the LUTs 5B, 5G and 5R in digital form in the aforesaid preferred embodiments. It may be, however, carried out in analog form by using a function generator.

[4] Although it is preferred that the highlight density values $D_{HX}$ and the shadow density values $D_{SX}$ are determined by a statistical method using histograms and the like as described in the aforesaid preferred embodiments, an operator may specify these points, measure the color density thereof and adopt the measured values as $D_{HX}$ and $D_{SX}$ in the case where the highlight point and the shadow point are found in the original 1.

Figure 14:
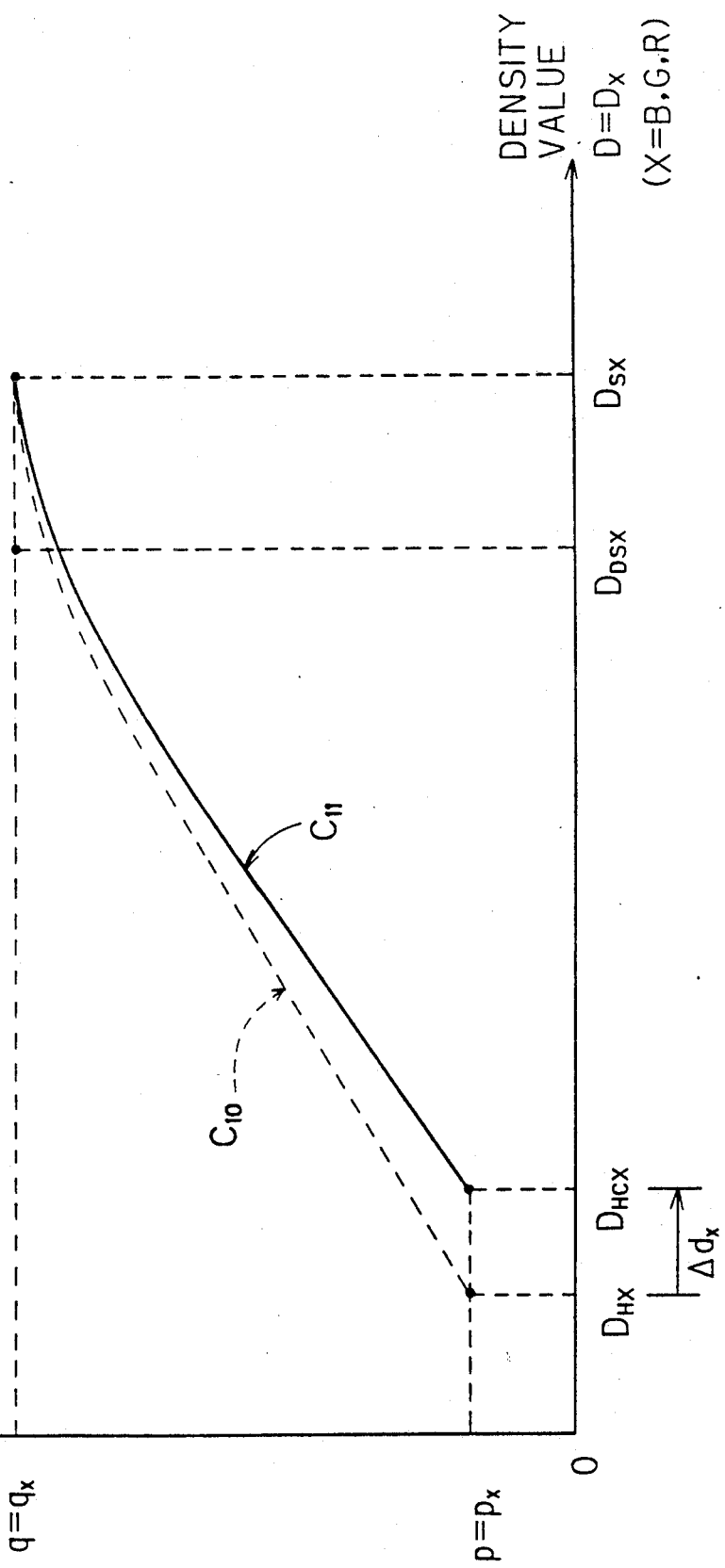
FIG. 14 illustrates correction of a highlight density value depending on a subject in an original to be processed.

[5] In generation of the conversion curves according to the present invention, correction in accordance with the type of a subject image in an original to be processed may be executed. For example, highlight density correction amounts $\Delta d_X$ ($X=B$, G and R) are predetermined in accordance with the subject image in the original to be processed, and values obtained by shifting the highlight density values $D_{HX}$ by the correction amounts $\Delta d_X$ may be taken as new highlight density values $D_{HCX}$ as shown in FIG. 14. In this method, a conversion curve $C_{10}$ before correction becomes a curve $C_{11}$ after the correction.

[6] The above-mentioned first preferred embodiment is applied only to color originals. The second preferred embodiment is, however, applicable to both color and monochrome originals. In the case of a monochrome original, a single highlight density value, a single shadow density value and a single dummy shadow density value are determined, and a single conversion curve is obtained.

[8] The present invention is applied not only to color process scanners, but also to other image processors for executing color separation and other processing steps on original images.

E. CONCLUSION

As described hereinabove, according to the present invention, a dummy shadow density value is determined in addition to a highlight density value and a shadow density value. The configuration of a conversion curve in the highlight part and the middle density part is determined by the highlight density value and the dummy shadow density value. The shadow density value is reflected only in the configuration thereof in the shadow part. Hence the configuration of the conversion curve in the respective density parts can be controlled together by relatively less parameters. A skilled operator is not required, therefore this method is suitable for automation.

In the first preferred embodiment, in addition to a highlight density value and a shadow density value, a dummy shadow density value is obtained for each color component in accordance with color fogging amount only in the shadow part. Thereby, a conversion curve suitable for eliminating the color fogging only in the shadow part is systematically generated. Since the conversion curve is generated based on such an objectively attainable value, the correction amount of the color fogging can be quantitatively controlled.

The color fogging is corrected at the time of the normalization conversion. The processing characteristics in other circuits in the color separation device are executed on the signal after the color fogging correction. Independently of the presence or absence of the color fogging in the original, the processing characteristics can be determined in these circuits without paying attention to color fogging in the original.

According to the present invention, only change in parameters in a predetermined function enables the simultaneous handling of color fogging elimination only in the shadow part and correction of global discoloring in an original. Therefore the present invention is suitable for automation of color separation conditions.

According to the second preferred embodiment of the present invention, a dummy shadow density value is determined while reflecting the density range width of a standard original. Density values having the same differences from the highlight density value can be converted by the normalization conversion into substantially equal or relatively approximate density values in the highlight part and the middle density part independently of the density range of the original to be processed. This method is independent of whether it is for the color fogging correction and is applicable to both color and monochrome originals. A proper reproduction character can always be ensured in a reproduced image through the normalization conversion independently of the density range of the original to be processed.

The dependence of the dummy shadow density value on the standard density range width can be arbitrarily changed by changing the weight coefficient in the weighted average, flexibility thereby being improved.

Although the present invention has been described and illustrated in detail, it is clearly understood that the same is by way of illustration and example only and is not to be taken by way of limitation. The spirit and scope of the present invention should be limited only by the terms of the appended claims.

We claim:

1. A method of generating a conversion curve which is employable for converting first density values obtained by photoelectrically reading an object image for each pixel and defined in a first density range into second density values defined in a second density range and having a reproduction characteristic suitable for prescribed image processing, said method comprising the steps of:

(a) designating a highlight density value and a shadow density value within said first density range;

(b) determining a dummy shadow density value within said first density range according to a predetermined determination rule; and (c) generating said conversion curve so as to satisfy two conditions as follows:

said conversion curve substantially passes through first and second points on a two-dimensional coordinate plane on which said conversion curve is defined, said first and second points being determined in accordance with said highlight density value and said shadow density value, respectively; and on said two-dimensional coordinate plane, said conversion curve extends along a line in a highlight density region which is defined around said highlight density value, said line being so defined as to pass through said first point and a third point determined in accordance with said dummy shadow density value.

2. The method of claim 1, wherein
said object image is a color image; and
said method further comprises the step of:
(d) conducting the steps (a) through (c) for each color component to obtain said conversion curve for each component.

3. The method of claim 2, wherein
the step (b) comprises the steps of:
(b-1) determining whether there is a fogging only in a shadow part on said color image and
(b-2) when there is said fogging only in said shadow part, determining said dummy shadow density value for each color component such that said dummy shadow density value is different from said shadow density value by a value representing an amount of said fogging in each color component.

4. The method of claim 3, wherein
the step (b) further comprises the steps of:
(b-3) when there is said fogging in the whole of said color image, executing the step of:
(b-3-1) determining said dummy shadow density value for each color component such that said dummy shadow density value is substantially equal to said shadow density value.

5. The method of claim 4, wherein
the step (a) comprises the steps of:
obtaining shadow average density values $D_{SAX}$ representative of average densities in a shadow portion of said color image for respective color components;

obtaining a shadow reference density value DSO as a function of said shadow average values $D_{SAX}$ for respective color components;

obtaining a value $\Delta D_{SX}$ for each color component as a function of a difference ($D_{SAX}-D_{SO}$) between said shadow average values $D_{SAX}$ and said shadow reference density value $D_{SO}$; and determining said shadow density value by adding said value $\Delta D_{SX}$ to said shadow reference density value $D_{SO}$ for each color component to obtain said shadow density value; and the step (b-2) comprises the steps of:

determining said dummy shadow density value for each color component by said shadow reference density value $D_{SO}$.

6. The method of claim 4, further comprising the step of:

(d) determining a mathematical function having a variable and first through third parameters and satisfying the conditions as follows:

said mathematical function becomes a non-linear function of said variable when a value of said second parameter is different from a value of said third parameter; and said mathematical function becomes a linear function of said variable when said value of said second parameter is identical to said value of said third parameter;

and further wherein the step (c) comprises the step of:

(c-1) substituting said highlight density value, said dummy shadow density value and said shadow density value for respective values of first through third parameters in said mathematical function for each color component, respectively, to obtain said conversion curve for each color component.

7. The method of claim 6, wherein:

the step (d) comprises the step of:

determining a logarithmic function as said mathematical function.

8. The method of claim 7, wherein:

said mathematical function is defined as:

$f(D:u,v,w) = p + (p-q)\log_{10}(g_1 + g_2)$ where $g_1$ and $g_2$ are defined such that:

$g_1 = 10^{-(D-u)/(v-u)}$
$g_2 = 0.1 - 10^{-(w-u)/(v-u)}$ and p and q are constants, D is said variable, and u, v and w are said first through third parameters, respectively.

9. The method of claim 1, wherein:

the step (b) comprises the steps of:

(b-1) determining a first value proportional to a width of a density range in a reference image;

(b-2) determining a second value proportional to said highlight density value; and (b-3) summing said first and second values to obtain said dummy shadow density value.

10. The method of claim 9, wherein:

the step (b I) comprises the step of:

(b-1-1) taking a weighted average of a shadow density value of said reference image and a value representative of said width of said density range in said reference image to determine said first value.

11. The method of claim 10, wherein:

the step (b-3) comprises the step of:

calculating said dummy shadow density value through the equation:

$D_{DSX} = K \cdot D_{HX} + K \cdot \Delta D_{FX} + (1-K) \cdot D_{SFX}$ where $D_{DSX}$ is said dummy shadow density value, $D_{HX}$ is said highlight density value, $\Delta D_{FX}$ is said value representative of said width of said density range in said reference image, $D_{SFX}$ is said shadow density value of said reference image, and K is a constant selected in the range of $0 \leq K \leq 1$.

12. The method of claim 11, wherein:

the step (b-3) comprises the step of selecting said constant K in the range of $0.5 \leq K \leq 1$.

13. The method of claim 12, further comprising the steps of:

(e) determining a type of a subject appearing in said object image; and (f) shifting said highlight density value in said conversion curve by an amount which is predetermined for each type of said subject, to thereby modify said conversion curve.

14. An apparatus for generating a conversion curve which is employable for converting first density values obtained by photoelectrically reading an object image for each pixel and defined in a first density range into second density values defined in a second density range and having a reproduction characteristic suitable for prescribed image processing, said apparatus comprising:

(a) means for statistically analyzing said object image to determine a highlight density value and a shadow density value within said first density range;

(b) means for determining a dummy shadow density value within said first density range according to a predetermined determination rule; and (c) means for generating said conversion curve so as to satisfy two conditions as follows:

said conversion curve substantially passes through first and second points on a two dimensional coordinate plane on which said conversion curve is defined, said first and second points being determined in accordance with said highlight density value and said shadow density value, respectively; and on said two-dimensional coordinate plane, said conversion curve extends along a line in a highlight density region which is defined around said highlight density value, said line being so defined as to pass through said first point and a third point determined in accordance with said dummy shadow density value.

15. The apparatus of claim 14, wherein said object image is a color image, and said apparatus further comprises:

(d) means for means enabling said means (a) through (c) to obtain said conversion curve for each color component.

16. The apparatus of claim 15, wherein said means (b) comprises:

(b-1) means for determining a correction value proportional to an amount of a fogging in a shadow part on said color image for each color component when it is indicated that said fogging exists only in said shadow part on said color image, and (b-2) means for shifting said shadow density value by said correction value to obtain said dummy shadow density value for each color component.

17. The apparatus of claim 16. wherein
said means (b) further comprises:
- (b-3) means for determining said dummy shadow density value for each color component such that said dummy shadow density value is substantially equal to said shadow density value when it is indicated that said fogging exists in the whole of said color image.

18. The apparatus of claim 14, wherein
said means (b) comprises:
- (b-1) means for determining a first value proportional to a width of a density range in a reference image;
- (b-2) means for determining a second value proportional to said highlight density value; and
- (b-3) means for summing said first and second values to obtain said dummy shadow density value.

19. The apparatus of claim 18, wherein:
said means (b-1) comprises:
- (b-1-1) means for obtaining a weighted average of a shadow density value of said reference image and a value representative of said width of said density range in said reference image to determine said first value.

20. A process scanner system comprising:
- (a) means for photoelectrically reading an original image;
- (b) means for enabling said means (a) to obtain a first image data;
- (c) means for statistically analyzing said first image data to determine a highlight density value and a shadow density value within a density range of said original image;
- (d) means for determining a dummy shadow density value within said density range of said original image according to a predetermined determination rule;
- (e) means for generating a curve so as to satisfy two conditions as follows:
    said curve substantially passes through first and second points on a two-dimensional coordinate plane on which said curve is defined, said first and second points being determined in accordance with said highlight density value and said shadow density value, respectively; and
    on said two-dimensional coordinate plane, said curve extends along a line in a highlight density region which is defined around said highlight density value, said line being so defined as to pass through said first point and a third point determined in accordance with said dummy shadow density value.
- (f) means for storing said curve in the form of a table memory;
- (g) means for enabling said means (a) again to obtain a second image data;
- (h) means for converting said second image data through said table memory to obtain a converted image data; and
- (i) means for recording a halftone dot image on a photosensitive material in accordance with said converted image data.

* * * * *